United States Patent [19]
Badersbach

[11] Patent Number: 5,899,113
[45] Date of Patent: May 4, 1999

[54] VARIABLE SPEED DRIVE HAVING INTERMEDIATE ALTERNATING MOVEMENTS

[76] Inventor: Jean Badersbach, Moulin du Vernet, 12260 Balaguier-d'Olt, France

[21] Appl. No.: 08/750,171

[22] PCT Filed: May 31, 1995

[86] PCT No.: PCT/FR95/00705

§ 371 Date: Jan. 13, 1997

§ 102(e) Date: Jan. 13, 1997

[87] PCT Pub. No.: WO95/33149

PCT Pub. Date: Dec. 7, 1995

[30] Foreign Application Priority Data

Jun. 1, 1994 [FR] France .................................. 94 06787

[51] Int. Cl.⁶ .................................................. F16H 27/00
[52] U.S. Cl. .................................................. 74/112; 74/123
[58] Field of Search .............................. 74/112, 123, 126, 74/116

[56] References Cited

U.S. PATENT DOCUMENTS

| | | |
|---|---|---|
| 1,858,934 | 5/1932 | Neurath . |
| 2,864,259 | 12/1958 | Troeger . |
| 2,959,062 | 11/1960 | Looker . |
| 4,711,139 | 12/1987 | Desousa . |

FOREIGN PATENT DOCUMENTS

| | | |
|---|---|---|
| 358 689 | 3/1929 | Belgium . |
| 572 406 | 11/1958 | Belgium . |
| 383 070 | 2/1908 | France . |
| 538 532 | 6/1922 | France . |
| 590 368 | 6/1925 | France . |
| 789 158 | 10/1935 | France . |
| 603 646 | 9/1934 | Germany . |
| 822 642 | 11/1951 | Germany . |
| 938 289 | 1/1956 | Germany . |
| 321 574 | 11/1929 | United Kingdom . |

*Primary Examiner*—Rodney H. Bonck
*Assistant Examiner*—Marcus Charles
*Attorney, Agent, or Firm*—Young & Thompson

[57] ABSTRACT

Variable speed drive to be connected to a rotating driving shaft (5) and to a rotating driven shaft (6) includes at least two angled bearings (7, 7'), controller for controlling the orientation of the axis (13, 13') of each angled bearing (7, 7') adapted so that the axes are offset from one another, and transmission (9,9', 11, 11') adapted so that in each phase of the movement at least one of the angled bearings (7, 7') engages and at least one of the bearings (7, 7') does not engage. The controller is adapted to alter the slant of all the angled bearings (7, 7') on the basis of a signal for controlling the variation in the variable speed drive ratio.

15 Claims, 14 Drawing Sheets

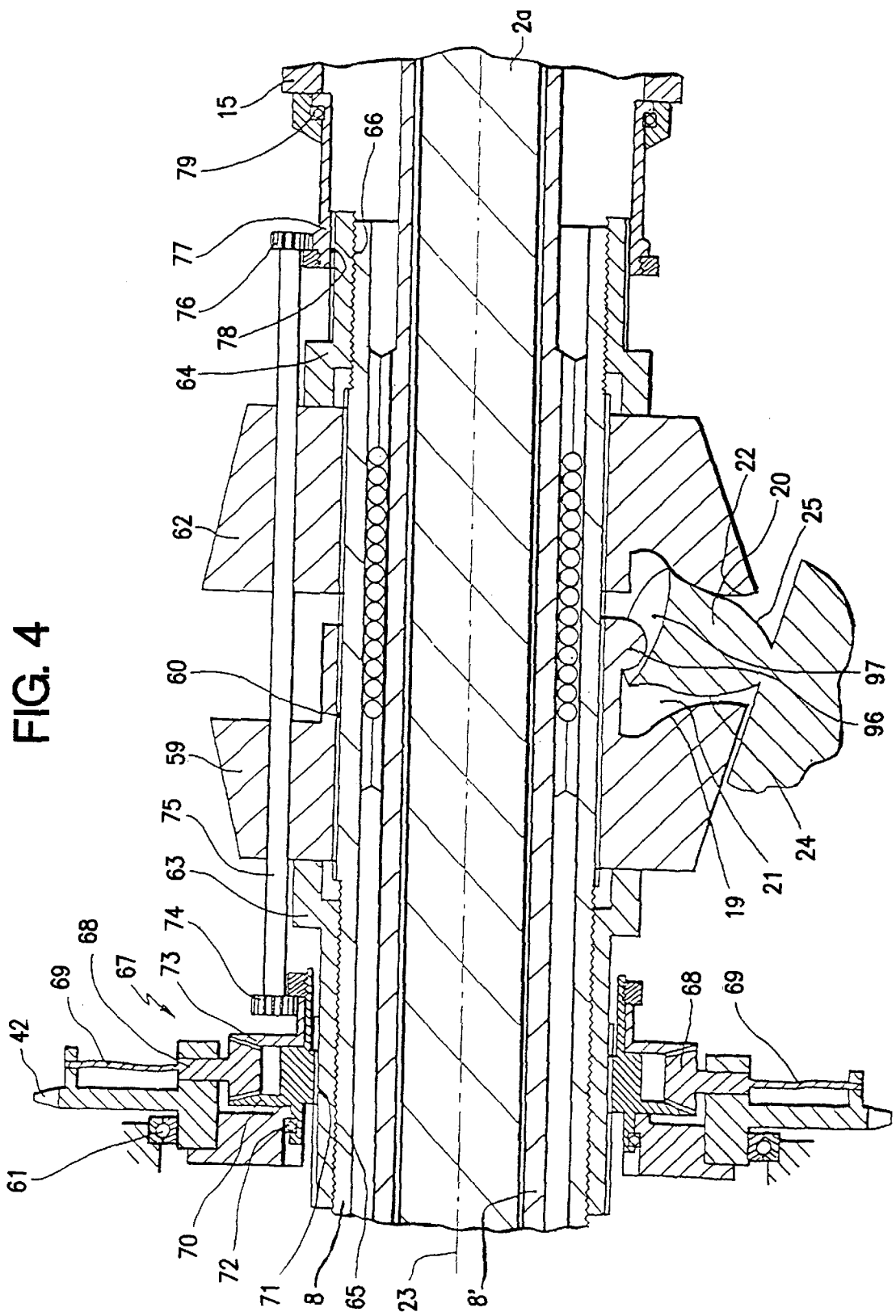

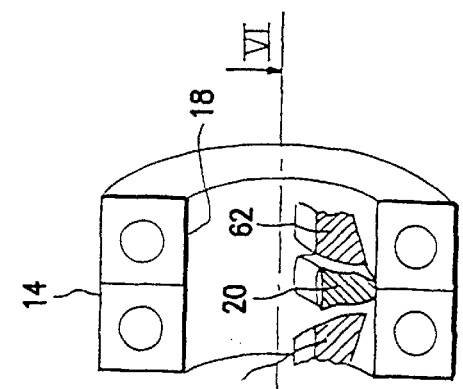
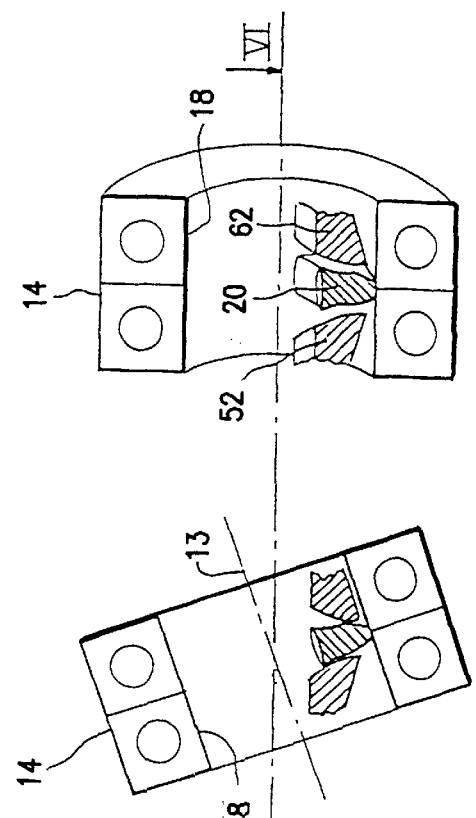
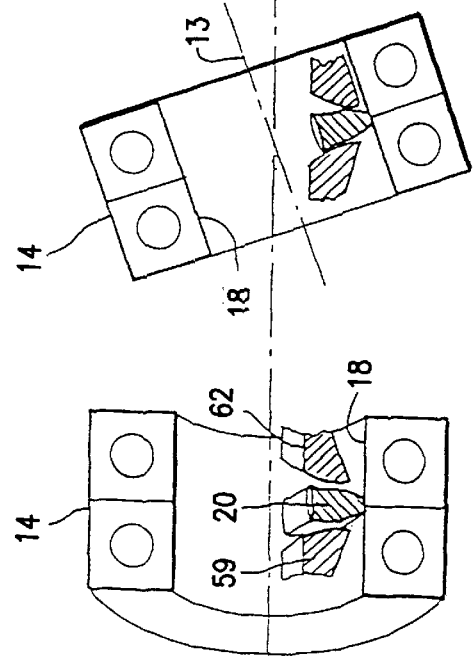
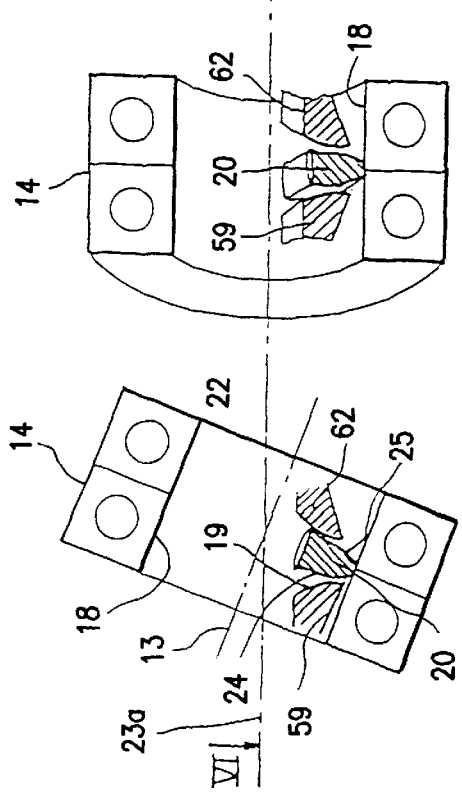
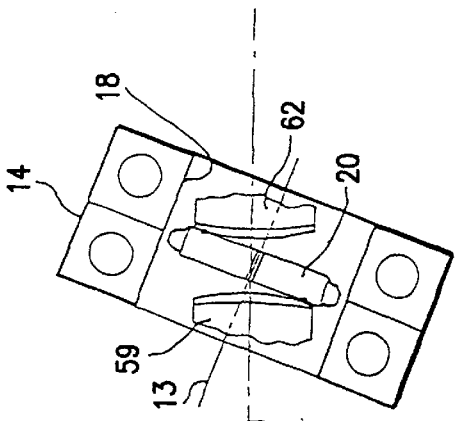
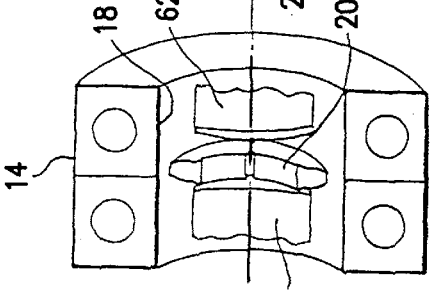
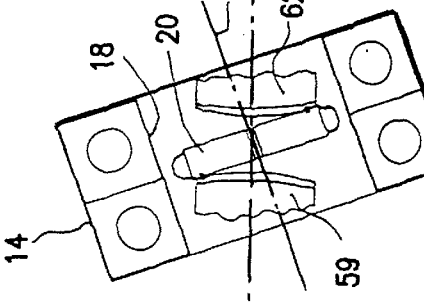
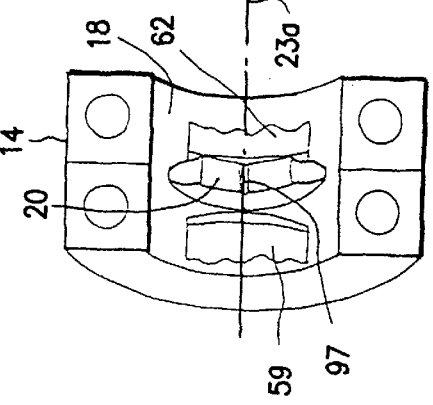

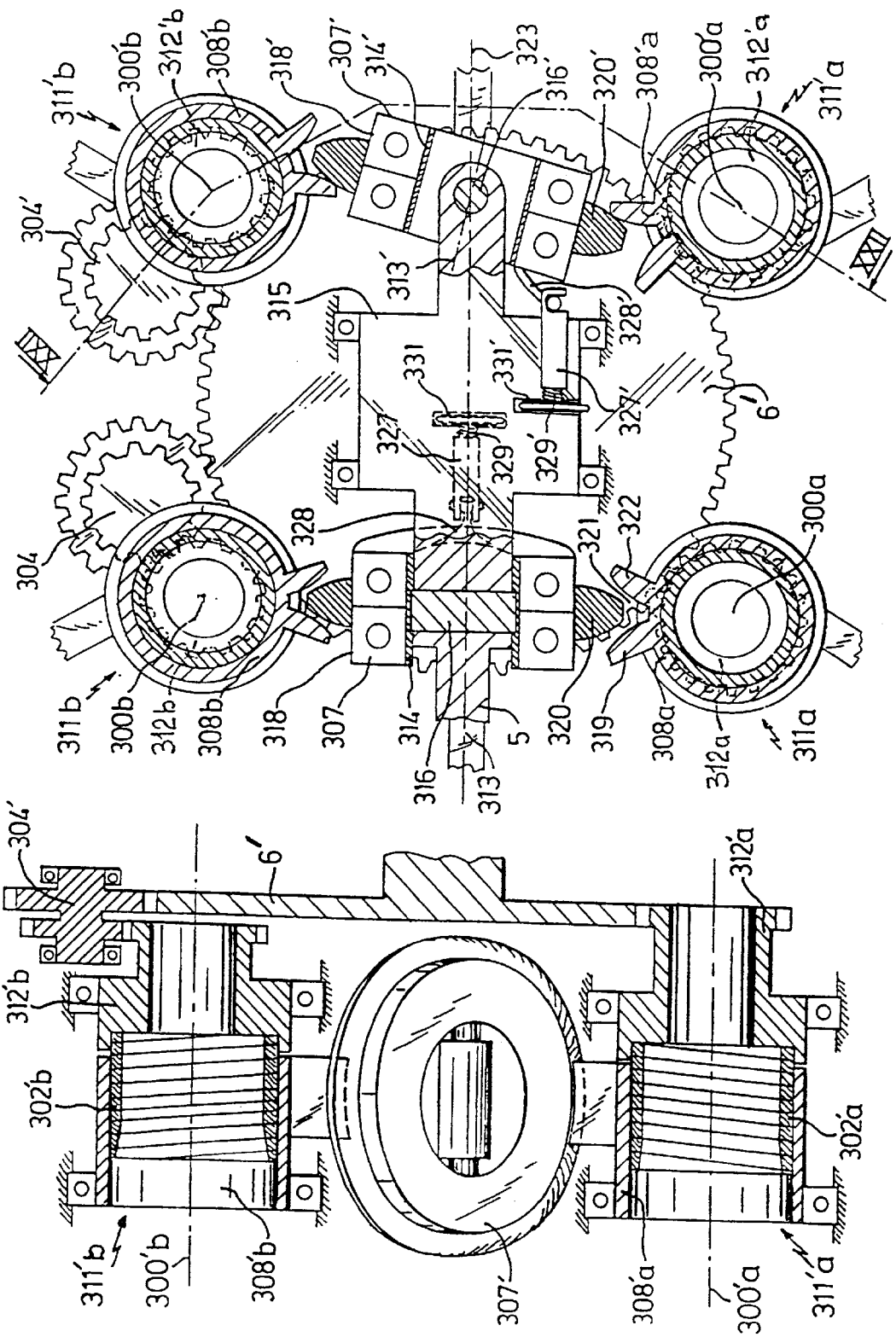

VARIABLE SPEED DRIVE HAVING INTERMEDIATE ALTERNATING MOVEMENTS

BACKGROUND OF THE INVENTION

The invention relates to a variable speed drive to be connected between a rotating driving shaft and a rotating driven shaft and allowing a continuous variation of the transmission ratio between these two shafts.

Different implementations of variable speed drives have already been described, comprising intermediate alternating movements of variable amplitude which determine the transmission ratio.

FR-A-1.133.080 describes a variable drive comprising connecting rod/crank systems having torsion bar and freewheel. FR-A-2.125.083 describes a variable speed drive comprising a series of peripheral assemblies which oscillate by action of a cam and are coupled by freewheels to a driven shaft. The transmission ratio depends on the amplitude of the cyclic movement of the peripheral assemblies which themselves depend upon the eccentricity of the cam. Also, FR-A-2.200.933 describes a variable drive having variable ratio straight gears functioning as a square wave generator, the variation of the amplitudes of the square waves causing the variation in the transmission ratio.

Moreover, drives are known which comprise an angled bearing allowing the generation of intermediate alternating movements transmitted onto a driven shaft by a freewheels mechanism (see, for example, FR-A-2.538.532).

Nevertheless, and in spite of the age of these documents, the different devices that they describe have not been usable, in practice, because of their low performance. Indeed, in addition to the large losses caused by the many moving elements, their design theory has the consequence that the engendered alternating movements do not have the shape of continuous successive square signals. It is, therefore, necessary to associate a hydraulic coupling and/or a flywheel to the variable drive, which causes the assembly to be oversized. Moreover, the movements of the variable drive generate strong vibrations. Moreover, with these known variable drives, the transmission of an engine brake is not possible.

Also, the movements carried out at high frequency engender fatigue and vibration problems which are not taken into account in known variable drives. Also, the mechanical play of the moving elements accumulate, further reducing performances, functioning precision, and the behavior over time of these variable drives, notably for the variable drive described in FR-A-2.200.330.

Equally, the control of the functioning and in load of the variation in amplitude inducing the variation of the transmission ratio and, more generally, the control of the various functioning modes of the conventional variable drives, present problems which are not fully resolved. Indeed, these controls must be carried out with hydraulic control units which are expensive, complex, bulky and which consume a large amount of energy.

SUMMARY OF THE INVENTION

The invention aims to palliate these disadvantages by proposing a continuously variable speed drive comprising intermediate alternating movements of variable amplitude having improved practical performances.

In particular, the invention aims to propose such a variable drive which does not necessitate the use of a hydraulic coupler and/or a flywheel, and whose theoretical transmission efficiency is improved, and notably is equal or very close to 1.

Also, the invention aims to propose such a variable drive which can be conveniently and industrially implemented, meaning in which the technological problems, notably in terms of implementation, longevity, vibration, balance, functioning play, . . . are reduced to a minimum, and which can be easily mastered.

The invention aims also to propose a variable drive whose control of the variations of the transmission ratio is simple and, notably, can be implemented without a control unit, or with a simple electrical control unit.

The invention also aims to propose such a variable drive which can be commutated, in functioning, according to several functioning modes, notably a motor mode with engine brake, a retrograde mode, and a neutral mode.

The invention also aims to propose a variable drive in which the transmission ratio can be modified at full power continuously between a minimum value R1 and a maximum value R2 at least seven times greater than R1.

The invention also aims to propose a variable drive whose response time after a transmission ratio variation command is very short, notably less than, or on the order of 1s.

Also, the invention aims to propose a variable drive able to be coupled to a thermal motor, and which allows the control of speed variations of a loading shaft while leaving the thermodynamic functioning parameters of the motor constant, and thus the coupling delivered by the motor. In particular, the control of the admitted gases of the motor must stay substantially constant, at the specific optimum consumption of the motor, the power variations being essentially obtained by the variation of the transmission ratio of the variable drive.

To do this, the invention relates to a variable speed drive to be connected to a rotating driving shaft and to a rotating driven shaft, characterized:

in that it comprises at least two angled bearings, each angled bearing comprising an exterior casing and an interior casing defining a common axle which is the axle of the angled bearing, in that it comprises means for controlling the orientation of the axle of each inclined bearing according to an angle of inclination whose adjustable value with respect to a fixed axle of the variable drive determines the transmission ratio of the variable drive, in that one of the angled bearing casings is an input casing receiving a driving rotating movement and is brought into rotation about the fixed axle by the rotation of the driving shaft, in that the other angled bearing casing is an output casing driven by the angled bearing assembly according to alternating movements (in translation or in rotation) the amplitudes of the oscillations being proportional to the inclination angle of the axle of the angled bearing with respect to the corresponding fixed axle, this output casing cooperating with at least one tappet to control the alternating movements (in translation or in rotation), in that it comprises transmission means adapted to transform and to transmit the alternating movements of each tappet into a unidirectional rotational movement of the driven shaft, in that said control means of the orientation of the axle of each angled bearing are adapted to cause these axles to exhibit, during normal functioning (meaning apart from the transmission ratio variation phases) the same inclination angle with respect to the corresponding fixed angle but out of phase with respect to one another relative to the rotating driving movement according to a constant and invariable out-of-phase angle, in such a manner as to transmit to the driven shaft movements which are out of phase with respect to one another, in that the transmission means are adapted such that, for each movement phase, at least one of the angled bearings is engaged and transmits a force and at least one of the angled bearings is not engaged and does not transmit force to the driven shaft, and in that said orientation control means of the axle of each angled bearing are adapted to modify the inclination of all of the angled bearings from a variable drive transmission ratio control signal.

According to the invention, said means for controlling the axle orientation of each angled bearing are adapted to carry out the progressive adjustment of the inclination of the angled bearings, the inclination of each angled bearing being modified in one or several phases of the movement where this angled bearing is not engaged and does not transmit force to the driven shaft.

Advantageously and according to the invention, said orientation control means of the axle of the angled bearings comprise:

movable control means adapted to displace themselves on the basis of a control amplitude, notably proportional, corresponding to a modified desired inclination, for each angled bearing or group of angled bearings which are simultaneously engaged, a control unit of an inclination control mechanism of the angled bearing(s), and mechanical memory means interposed between the movable control means and each control unit, these mechanical memory means being adapted to store up a control amplitude corresponding to a modified inclination and to transmit a rotation control to a control unit only when the resistance given by this control unit is less than a predetermined threshold value. Advantageously and according to the invention, these mechanical memory means comprise, for each control unit, a torsion spring interposed between the two rotating shafts of said control means of the orientation of the axle of the angled bearings.

According to a first embodiment of the invention, the variable drive comprises two pairs of angled bearings, each pair being supported by a fixed shaft distinct from the other pair, the two angled bearings of a same pair being out of phase by 180°, each angled bearing supported by a fixed shaft being out of phase by 90° with respect to each angled bearing carried by the other fixed shaft.

According to the invention, the variable drive comprises at least two partial transmission assemblies, adapted to transmit movements of opposite phase to the driven shaft, and notably four partial transmission assemblies adapted to transmit to the driven shaft movements which are out of phase by 90° with respect to one another.

Each assembly for the partial transmission of movement comprises:

a first transmission device adapted to generate, from the rotation of the driving shaft, an alternating movement of at least one tappet according to a predetermined but continuously adjustable amplitude, a second transmission device adapted to transform the alternating movement of the tappet into a rotating alternating movement of an oscillating shaft;

a third device for the unidirectional transmission of the rotating movement of the oscillating shaft to a rotating output unit which is coupled in rotation to the oscillating shaft only in one or the other of the rotation directions, the output rotating unit being coupled in rotation to the driven shaft.

According to a second embodiment of the invention, the variable drive comprises two angled bearings out of phase by 90° with respect to one another, said transmission means being adapted to transmit to the driven shaft the movements of each output casing alternatively during each quarter turn of the driving shaft.

In an embodiment according to the invention, the variable drive is characterized in that it comprises at least one rotating and oscillating tappet comprising at least one area of bearing in contact with an area of bearing connected to or interacting with the output casing of an angled bearing. According to the invention, the output casing is the external casing of the angled bearing.

A variable drive according to the invention can be implemented in such a manner that the angled bearings and the partial transmission assemblies generate alternating movements whose speed profile has a quasi-square shape, the alternations being successively continuous over each rotation and driving the driven shaft to a constant uniform speed if the input shaft turns at a constant speed.

A variable drive according to the invention is also characterized in that, said output casing and each corresponding tappet define contact surfaces having defined complementary shapes to generate said successive continuous alternating movements of substantially square shape.

According to the invention, the complementary shapes are defined such that, if the driving shaft turns at constant speed, the speed (in rotation or in translation) of the tappet is at least substantially constant during a duration corresponding at least to a quarter turn of the rotating driving shaft.

According to the invention, each tappet is connected to a rotating output unit by the intermediary of at least one unidirectional linking device.

According to the invention, the variable drive comprises at least one unidirectional linking device able to be controlled between an active unidirectional blocking position and an inactive position allowing the tappet or an intermediate oscillating shaft, and the corresponding output rotating unit in free rotation with respect to one another. This third unidirectional transmission device advantageously comprises two unidirectional linking devices mounted in opposite directions, a driving unidirectional linking device carrying out a unidirectional blockage in the driving direction, and the other retrograde unidirectional linking device carrying out a unidirectional blockage in the retrograde direction. And the variable drive according to the invention comprises control means for each unidirectional linking device according to at least three functioning modes:

a driving mode with engine brake in which the driving unidirectional linking device is constantly maintained in an active position and the retrograde unidirectional linking device is maintained in the active position only when the corresponding tappet and the corresponding output rotating device move in the driving direction:

a retrograde mode in which the driving unidirectional linking device is constantly maintained in an inactive position and the retrograde unidirectional linking device is constantly maintained in an active position, a neutral mode in which the two unidirectional linking devices are maintained in an inactive position.

Advantageously and according to the invention, each unidirectional linking device is constituted by a helicoidal spring whose extremity is anchored in said output rotating device and whose other extremity cooperates with a movable area of friction, and the variable drive comprise functioning control means for each movable friction area adapted so that, when the friction area is applied against the extremity of the spring, carries out a unidirectional blocking and such that, when this friction area is not applied against the extremity of the spring, the rotating device is in free rotation, each spring being able to be controlled to function in an active position or in inactive position.

Advantageously and according to the invention, the variable drive comprises a retrograde direction unidirectional linking spring, and means adapted to engender, in the driving mode with engine brake, alternating movements in axial translation of the area of friction of the retrograde direction unidirectional linking spring which is commutated, in a cyclical fashion, in a high frequency functioning in an active position in the driving direction of the corresponding tappet and in inactive position in the retrograde direction of the corresponding tappet.

The invention also relates to a variable drive comprising, in combination, all or a portion of the characteristics mentioned above, or hereafter.

BRIEF DESCRIPTION OF THE DRAWINGS

Other characteristics and advantages of the invention will emerge from the following description which refers to the attached figures in which:

FIG. 4 is a detailed axial sectional view of the play adjustment mechanism of the variable drive of FIGS. 2 and 3, FIGS. 5*a*, 5*b*, 5*c* and 5*d* are axial sectional schematics illustrating the various positions assumed by an angled transmission bearing of a variable drive according to the first embodiment of the invention upon rotation of the driving shaft, the inclination of the bearing with respect to the fixed shaft remaining unchanged, FIGS. 6*a*, 6*b*, 6*c* and 6*d* are sectional schematics according to the line VI—VI of FIGS. 5*a*, 5*b*, 5*c* and 5*d*, FIGS. 7 and 8 are views which are similar to FIGS. 5*a* and 6*a* of the bearing represented with a null inclination with respect to the fixed shaft.

FIG. 21 is a sectional schematic view along the fixed axle of the angled bearings of a third embodiment of the variable drive according to the invention having two angled bearings more particularly designed for a cycle transmission, FIG. 22 is a sectional schematic view according to line XXII—XXII of FIG. 21.

DESCRIPTION OF THE PREFERRED EMBODIMENTS

Figure 1:
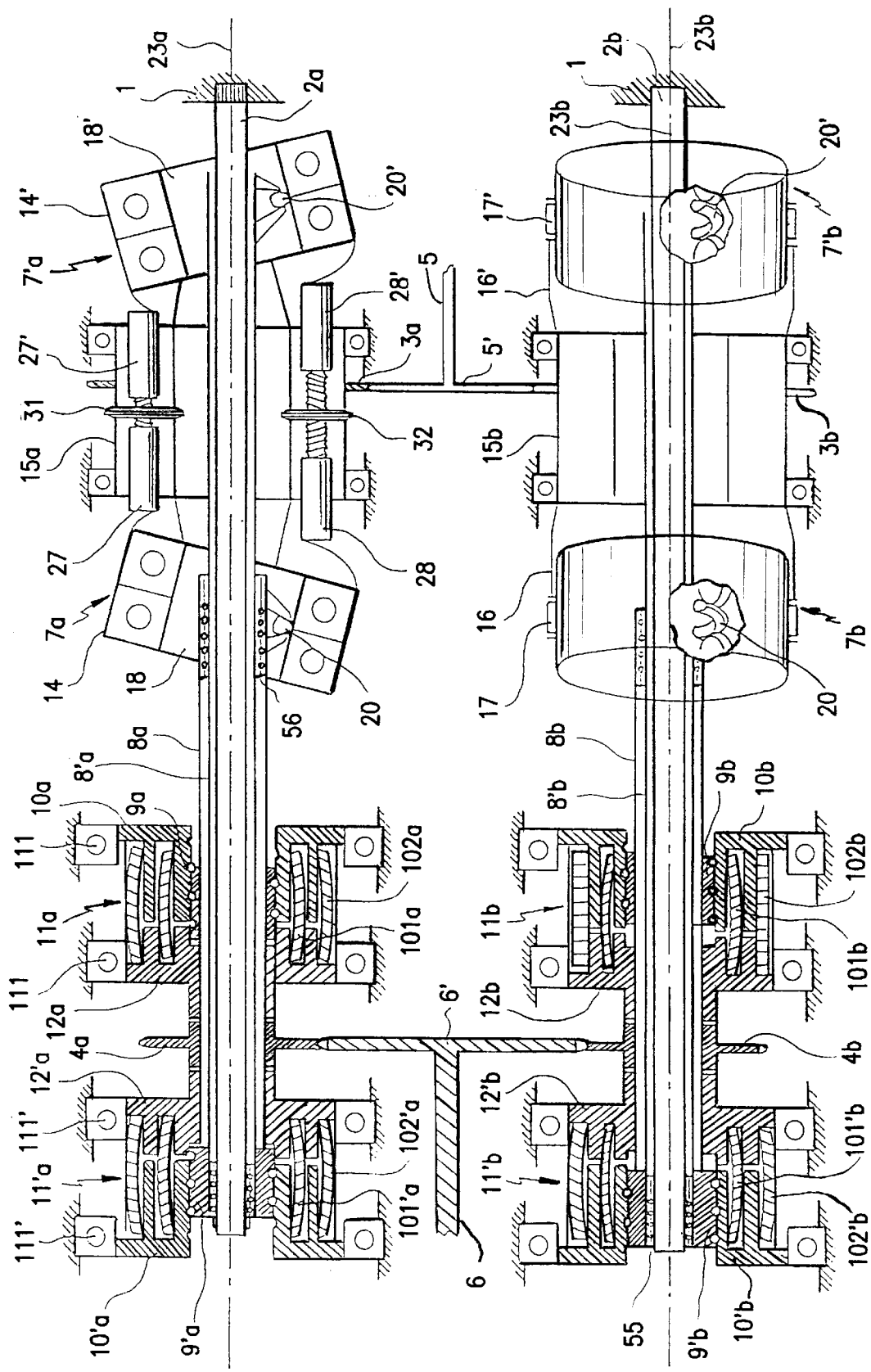
FIG. 1 is axial sectional schematic illustrating the kinematics of the assembly of a variable drive according to a first embodiment of the invention.
Figure 2:
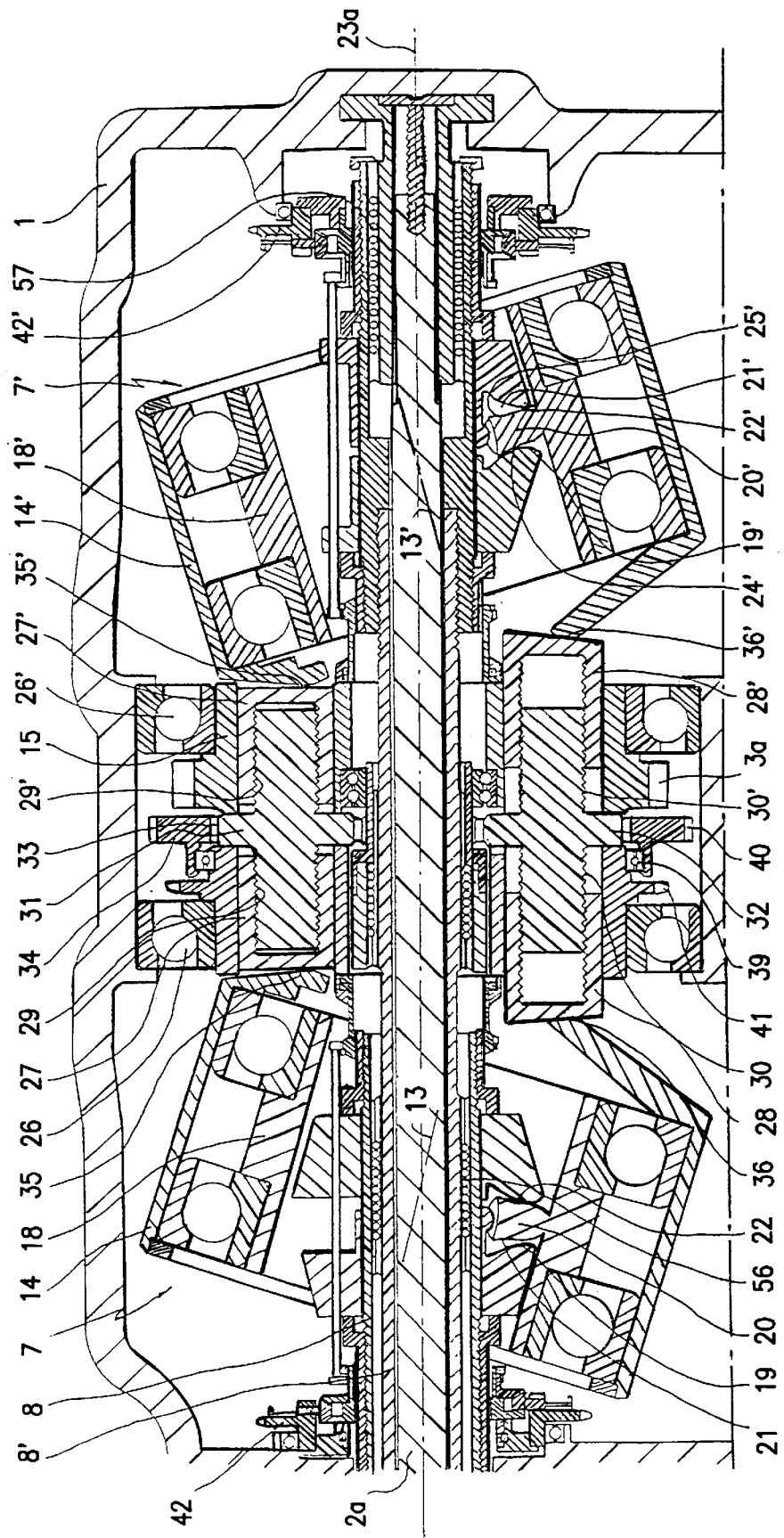
FIG. 2 is a detailed axial sectional view of one extremity on the side of the driving shaft, of a fixed shaft of the variable drive according to a first embodiment of the invention.
Figure 3:
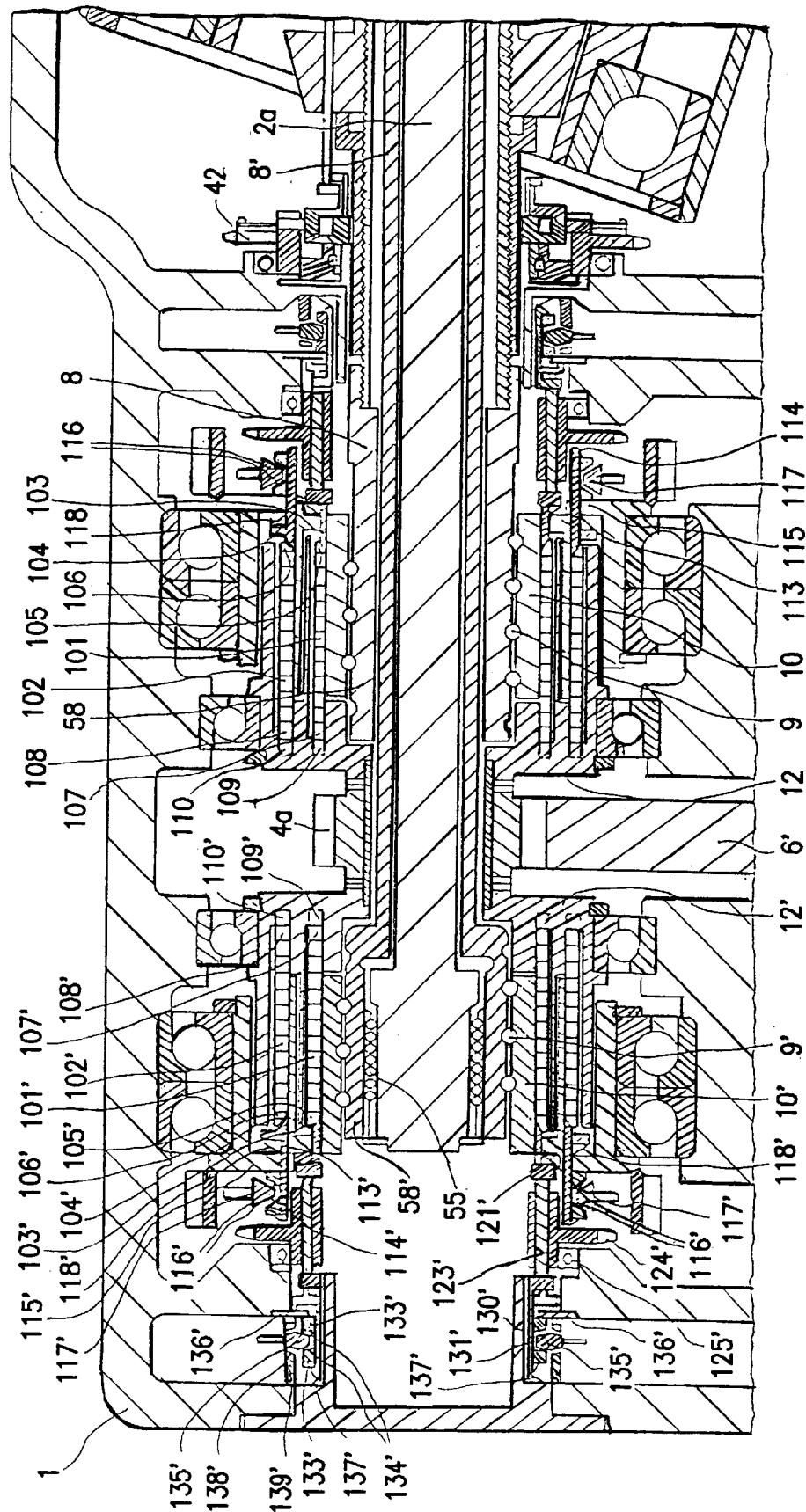
FIG. 3 is a detailed axial sectional view in an axial extension of FIG. 2 of the other extremity, on the side of the driven shaft, of the fixed shaft of the variable drive according to the first embodiment of the invention.
Figure 8:
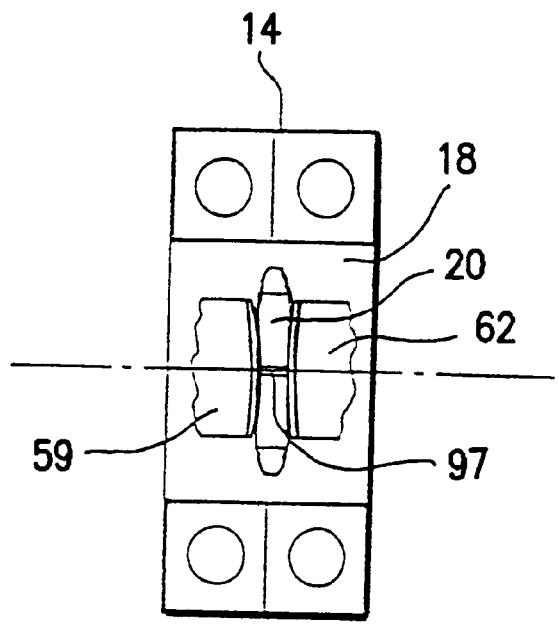
Figure 7:
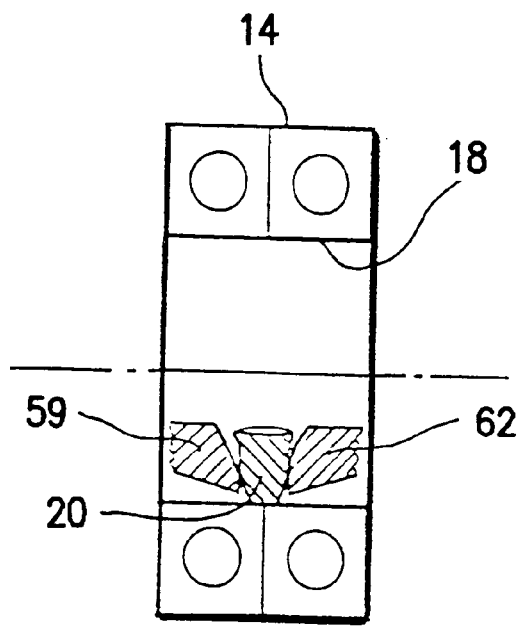

The variable speed drive according to the invention shown in FIGS. 1 to 3 comprises a closed casing 1 supporting two fixed shafts 2*a*, 2*b* of distinct and mutually parallel fixed axles 23*a*, 23*b*. Each fixed shaft 2*a*, 2*b* is associated with two assemblies 7 to 12, 7' to 12' of partial transmission centered around the same fixed axle 23*a*, 23*b* and transmitting movements which are out of phase by 180° to a same output pinion 4*a*, 4*b* rotatively mounted about each fixed axle 23*a*, 23*b*. The two output pinions 4*a*, 4*b* are each connected through the casing 1 to a pinion 6' or to a connected crown of a driven shaft 6 or constituting this driven shaft 6. For example, the two output pinions 4*a*, 4*b* mesh directly on an input crown of a differential which forms the driven shaft 6 of the variable drive. The assemblies 7*a* to 12*a*, 7'*a* to 12'*a*, of partial transmission supported by one 2*a* of the fixed shafts, and, centered about the same fixed axle 23*a*, are out of phase by 90° with respect to each of the partial transmission assemblies 7*b* to 12*b*, 7'*b* to 12'*b*, centered about the other fixed axle 23*b* and supported by the other fixed shaft 2*b* (meaning transmitting to their output pinion 4a movements which are out of phase by 90° with respect to the movements transmitted to the output pinion 4*b* of the other fixed axle 23*b*). The opposed movements (out of phase by 180°) of the two output pinions 4*a*, 4*b* can be transmitted in the same direction (in phase) to a common driven shaft 6 by an inverting pinion mechanism described hereafter. Each transmission assembly 7 to 12, 7' to 12' is also connected to an input pinion 3*a*, 3*b* rotatively mounted about each fixed shaft 2*a*, 2*b* and which is coupled to a pinion 5' of a driving shaft 5 through the casing 1. The driving shaft 5 is, for example, driven by a thermal motor.

In FIGS. 2 through 4, only the partial transmission assemblies 7 to 12 and 7' to 12' supported by one of the fixed shafts 2a are represented in detail. The partial transmission assemblies supported by the other fixed shaft 2b are identical but angularly out of phase by 90° with respect to those of the fixed shaft 2a (FIG. 1). Moreover, two partial transmission assemblies supported by a same fixed shaft 2a or 2b are in phase opposition.

Hereafter is described, with reference to FIGS. 2 through 4, two transmission assemblies 7 to 12, 7' to 12' supported by one 2a of the two fixed shafts 2a, 2b.

Each partial transmission assembly 7 to 12, 7' to 12' comprises a first transmission device 7, 7' generating, from the rotation of the driving shaft 5, an alternating movement in axial translation of a tappet 8, 8', according to a predetermined but continuously variable amplitude; a second transmission device 9, 9' transforming the alternating movement in translation of the tappet 8, 8', into a rotating alternating movement of an oscillating shaft 10, 10'; and a third unidirectional transmission device 11a and 11b, 11'a and 11'b of the rotating movement of the oscillating shaft 10, 10' to an output rotating device 12, 12' which is driven in rotation by the oscillating shaft 10, 10' only in one or the other of the rotation directions, the output rotating device 12, 12' driving the driven shaft 6 in rotation, by the intermediary of the output pinion 4a.

The two output rotating devices 12 and 12' of the transmission assemblies 7 to 12 and 7' to 12' turning about a same fixed axle 23a are coupled to the same output pinion 4a supported by this fixed axle 23a. And the two transmission assemblies 7 to 12, 7' to 12' receive the driving movement by the same input pinion, 3a turning about this fixed axle 23a, and to which the first transmission devices 7, 7' are coupled.

Each first transmission device 7, 7' comprises an angled bearing mounted on the fixed shaft in such a manner that the orientation of the axle 13, 13' of the bearing with respect to the corresponding fixed axle 23a can be modified. Each angled bearing comprises, for example, two series of balls or rollers, one on each axial side of the bearing, and exterior casings 14, 14' and interior 18, 18' defining rolling paths. These rolling paths are symmetric in revolution about an axle 13, 13', which is the axle of the angled bearing, and constrain the balls or rollers, in such a manner that the exterior and interior casings are free in rotation one with respect to the other but axially connected one to the other, in the manner of a conventional ball bearing.

The exterior casing 14, 14' of each angled bearing is an input casing 14, 14' driven in rotation about the fixed axle 23a from the rotating movement of the driving shaft 5. To do this, the input pinion 3a is formed outside of a cylinder 15 which carries, on each side of the axial direction, two forks 16 and 16' which are diametrically opposed and which are associated with the exterior casing 14, 14' by an articulation having a radial axle 17, 17' (FIG. 1). The two forks 16, 16' constitute, in this manner, a driving screed of each exterior casing 14, 14' which is articulated to this screed and is driven by the corresponding input pinion 3a. The interior casing 18, 18' of each angled bearing 7, 7' is an output casing 18, 18' which cooperates with radial bearing areas 19, 19', 22, 22' carried by the tappet 8, 8' to control the alternating translation movements engendered by the external inclined casing 14, 14', itself engendering alternating rocking movements (meaning oscillations and back-and-forth movements of the radial plane of the bearing and the interior casing 18, 18'). To do this, the interior casing 18, 18' comprises at least one crown portion 20, 20' extending in projection toward the interior and toward the fixed axle 23a in a throat 21, 21' defined by and between a radial bearing area 19, 19' and an opposed radial bearing area 22, 22' both of which are blocked in rotation and fixed in an adjustable manner in translation with respect to the tappet 8, 8'. The crown portion 20, 20' comprises an axial groove 97 engaged by a pin or a lug 96 cooperating with the tappet 8, 8', to block the interior casing 18, 18' in rotation. In a non-illustrated variation, the crown portion 20, 20' can be replaced by a complete crown and the interior casing 18 can be in free rotation about the fixed shaft 2a.

The lateral faces 24, 24' and 25, 25' of this crown portion 20, 20' come into contact with the bearing areas 19, 19' and 22, 22' of the throat 21, 21' in such a manner as to, on the one hand, drive the tappet 8, 8', in translation and, on the other hand, to authorize the modifications of the inclination of the angled bearing with respect to the fixed axle 23a of the fixed shaft 2a. More precisely, these lateral faces 24, 24', 25, 25' form rolling bearing areas on the corresponding bearing areas 19, 19', 22, 22' of the throat 21, 21'. In this manner, the crown portion 20, 20' of the interior casing 18, 18' and the bearing area 19, 19' of the tappet 8, 8' define contacting surfaces 19, 19' and 24, 24' of complementary shapes which are defined to roll one against the other. When the exterior casing 14, 14' turns around the fixed shaft 2a, the interior casing 18, 18' oscillates with respect to the fixed axle 23a of this fixed shaft 2a, its inclination (meaning the position of the rolling radial plane) with respect to this axle 23a varying angularly according to an oscillating alternating movement on each side of a plane radial to the fixed axle 23a. From then on, the tappet 8, 8' activated by the crown portion 20, 20' is driven according to an alternating axial movement of translation along the fixed axle 23a.

The amplitude of these oscillations depend on the inclination given to the external casing 14, 14' with respect to the fixed axle 23a of the fixed shaft 2a.

This inclination, which corresponds to the orientation of the axle 13, 13' of the angled bearing is maintained, but can be modified and adjusted by adjustment means which determine the orientation of this axle 13, 13' with respect to the fixed axle 23a. The input cylinder 15 which supports the input pinion 3a is rotatively mounted with respect to the casing 1 around the fixed shaft 2a by two bearings 26, 26'. This cylinder 15 comprises two pistons 27, 27' extending in parallel to the fixed shaft 2a in the respective direction of the exterior casings 14, 14', and two adjustment pistons 28, 28' diametrically opposed to the first pistons. The two pistons 27, 27' or 28, 28' of a pair of pistons are threaded in inverse directions and engage respectively in corresponding threadings 29, 29' or 30, 30' of screws supported by the pinions 31, 32. The two pinions 31, 32 are rotatively mounted with respect to the cylinder 15. The interior teeth 33 of a crown 34 (FIG. 2) mesh with the teeth of the pinions 31, 32 to drive them in rotation. In this manner, when the crown 34 turns with respect to the cylinder 15, the pinions 31, 32 turn about their axis, and the pistons 27, 27' and 28, 28' slide in translation in parallel to the fixed axle 23a. The two pistons 27, 27' and 28, 28' of a same pair of pistons slide in opposite directions. The pistons of the first pair 27, 27' slide in opposite directions of the pistons of the second pair 28, 28'. The free extremity 35, 35' respectively 36, 36' of each piston 27, 27' and 28, 28' form an abutment which leans against a corresponding lateral bearing area 37, 37', 38, 38' of the exterior casing 14, 14'. In this manner, the inclination of this exterior casing 14, 14' with respect to the axle of the fixed shaft 2a is modified. The crown 34a is rotatively mounted with respect to the cylinder 15 thanks to a bearing 39. The crown 34 comprises moreover external teeth 40 which allow to drive it in rotation. Moreover, each cylinder 15 supports a chain pinion having external teeth 41 which allows to locate the position of the crown 34 with respect to the cylinder 15 by the intermediary of an inclination control mechanism described hereafter.

The two tappets 8, 8' are cylinders which are concentric about the fixed axle 23a and the fixed shaft 2a, and are mounted in a translationally movable fashion and are blocked in rotation one with respect to the other by a ball and axial groove system 56. Each fixed shaft 2a is supported and blocked in rotation with respect to the casing 1 by one of its free extremities. The other free extremity of the fixed shaft 2a is not associated with the casing 1, but is supported by the internal tappet 8' of greater length. A ball and axial groove system 55 blocks in rotation the internal tappet 8' of greater length with respect to the fixed shaft 2a while authorizing the alternating axial translations of the tappet 8'.

The complementary shapes of the lateral bearing areas 24, 24' and 25, 25' of the crown portion 20, 20' and the bearing areas 19, 19' and 22, 22' cooperating with the contacting tappet 8, 8' are defined in such a manner that if the driving shaft 5 turns at a constant speed, the translational speed engendered in the tappet 8, 8' is at least substantially constant for a duration corresponding at least to a quarter turn of the rotating driving shaft 5. In this manner, one is assured that during each turn of the rotation of the driving shaft 5, at least one of the tappets 8, 8', which are out of phase by 90° with respect to one another in their movements, is active and transmits the driving movement during at least a quarter turn (see FIGS. 9 and 11). These respective shapes of the bearing areas 19, 19', 24, 24', and 22, 22', 25, 25' are also defined so as to roll one against the other with a minimum of sliding. Advantageously, at least the portions in contact with the bearing areas during the constant speed phases of the tappet have shapes which are defined to roll without sliding at least to an inclination position—notably and preferably, the average inclination position—of the range of variation of this inclination.

The lateral bearing areas 24, 24' and 25, 25' of the crown portion 20, 20' and the cooperating bearing areas 19, 19' and 22, 22' of the tappet 8, 8' extend around their axle 13, 13' and 23a over an angular area less than 90°. The two angled bearings of a same fixed axle 23a, 23b are mutually symmetrical with respect to a median of symmetry radial plane of the corresponding input cylinder 15a, 15b. An example of the shape of the bearing areas 19, 19', 22, 22', 24, 24', 25, 25' in contact with the angled bearing and with the tappet 8, 8' is shown in FIG. 4 and FIGS. 5a to 5d, 6a to 6d, 7 and 8 which schematically represent an angled bearing in different positions.

The crown portion 20 is formed of at least one portion of a volume of revolution around the axle 13 of the bearing. Its lateral bearing area 25 oriented at the side of the cylinder 15 has a profile which rolls against the bearing area 22 facing the cooperating abutment 62 of the tappet 8.

The lateral bearing area 24 of the crown portion 20 oriented at the opposite of the cylinder 15 and rolls against the bearing area 19 facing the cooperating abutment 59 of the tappet 8.

FIGS. 5a and 6a represent relative positions of the crown portion 20 and the bearing areas 19, 22 of the abutments 59, 62 when the tappet is pushed back in its most distant position relative to the cylinder 15, as represented in FIGS. 2 and 3. FIGS. 5b, 6b represent these positions after a rotation of 90° of the cylinder 15 and of the exterior casing 14 of the bearing. FIGS. 5c, 6c and 5d, 6d represent these positions after a rotation of 180°, respectively 270° with respect to the FIGS. 5a, 6a of the cylinder 15 and of the exterior casing 14 of the bearing. As is seen, the rotation of the cylinder 15 generates an alternating translating motion of the abutments 59, 62 and thus of the tappet 8, whose amplitude increases with the value of the inclination angle of the axle 13 with respect to the axle 23a of the fixed shaft 2a.

When this inclination is null (FIGS. 7 and 8), the tappet 8 remains immobile.

Moreover, the variable drive comprises a mechanism to adjust the axial play between the bearing areas 19, 19', 22, 22' in contact on either side of the crown portion 20, 20' (FIG. 4).

As seen in FIG. 4, the bearing areas 19 and 22 are formed on faces which are globally radial with respect to the two abutments 59, 62 which are mounted to be axially slidable by grooves 60 outside of the tappet 8. These abutments 59, 62 are axially maintained and controlled in axial translation in opposite directions respectively by two sleeves 63, 64 which push against these abutments 59, 62 opposite the bearing areas 19, 22. These sleeves 63, 64 are threaded and engaged about a threading 65, 66 of the exterior surface of the tappet 8. A chain pinion 42 controlled in rotation by a control mechanism, brings into rotation one and/or the other of the two sleeves 63, 64 axially towards the abutments 59, 62 when the inclination of the bearing is diminished, and axially away from the abutments 59, 62 in the contrary case.

The pinion 42 is rotatively mounted with respect to the casing 1 thanks to a landing or bearing 61. It brings the sleeve 63, 64 in rotation around the tappet 8 by the intermediary of a differential mechanism 67. Thanks to the threadings 65, 66, the rotation of the sleeve 63, 64 brings about their axial translation along the tappet 8.

The pinion 42 supports two conical teeth pinions 68 having a radial rotation axis. Each pinion 68 is mounted in a free rotation fashion and is coupled at one extremity with a torsion spring 69 whose other extremity is anchored in the pinion 42.

The pinion 68 meshes at one side with a conical teeth pinion 70 coupled by grooves 71 to the sleeve 63. The pinion 70 is rotatively mounted with respect to the pinion 42 thanks to a landing or a bearing 72. The pinion 68 meshes at the other side with a conical teeth pinion 73 rotatively mounted around a cylindrical axial extension of the pinion 70. This pinion 73 comprises straight exterior teeth which mesh with a cooperating pinion 74 in rotation of an extremity of a linking rod 75 which axially traverses the abutments 59, 62. The opposite extremity of this linking rod 75 is coupled to a pinion 76 which meshes with straight external teeth of a pinion 77 to bring it in rotation around the tappet 8. This pinion 77 is coupled in rotation to the sleeve 64 by axial grooves 78. The pinion 77 is rotatively mounted with respect to the cylinder 15 by the intermediary of a landing or bearing 79.

Thanks to this differential mechanism 67, the rotation of the pinion 42 can only bring about the displacement of the abutment 59, 62 which does not push against the crown portion 20. In the position shown in FIG. 4, it is the abutment 59 which can be displaced. Moreover, the torsion spring 69 allows to recall the abutments 59, 62 to an axial central median position of each side of the crown portion 20.

One can, in this manner, modify the gap of the bearing areas 22, 22' and 19, 19' as a function of the inclination of the bearing and the play to recapture. This adjustment can be automatically carried out upon the modification of the inclination thanks to the common control means (FIG. 13).

In a non-illustrated variation, the adjustment mechanism of the axial play between the bearing areas can be constituted by an axial position adjustment device of one 59 of the abutments, the other abutment 62 being axially blocked and cooperating with the tappet 8. In this case, the mechanism is restrained to the pinion 42 directly mounted with the grooves 71 on the grooved sleeve 63.

Figure 13:
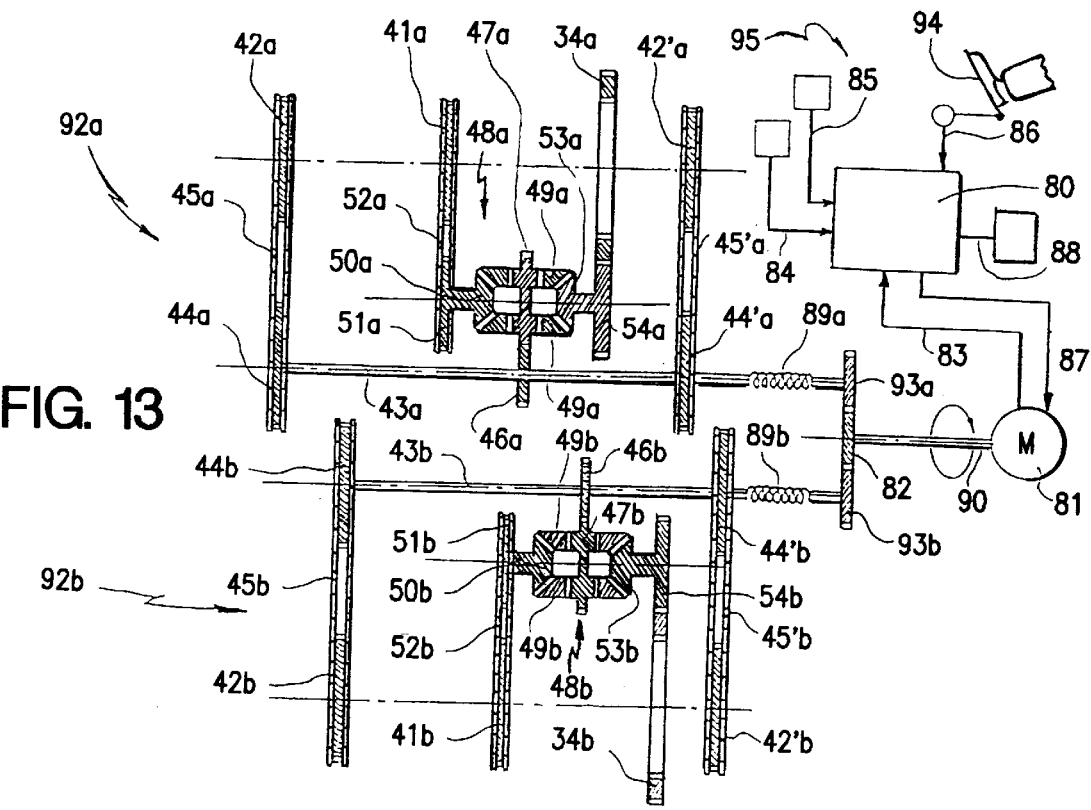
FIG. 13 is an axial sectional schematic illustrating the general kinematics of a control mechanism of the variation of the transmission ratio of a variable drive according to the invention.

FIG. 13 represents control means for the regulation of the inclination of the bearings and of the plays allowing to vary the transmission ratio of the variable drive. A rotating control shaft 90 supports a pinion 82 controlling the two similar control mechanism assemblies 92a, 92b, one for the transmission assemblies of each fixed axle 23a, 23b. The control shaft 90 is movable and brought into rotation according to a control amplitude corresponding to a transmission ratio variation control signal of the variable drive imposed by the user. The angular position of the control shaft 90 determines the value of the angle of inclination of all of the angled bearings, and thus the transmission ratio of the variable drive.

Each mechanical control assembly 92a, 92b, comprises a secondary control shaft 43a, 43b. This secondary control shaft 43a, 43b is coupled to the extremity of a torsion spring 89a, 89b whose other extremity is coupled to a pinion 93a, 93b meshing on the pinion 82. The torsion spring 89a, 89b is adapted to store up the rotational stroke imparted by the control shaft 90 and to progressively restore it to the secondary control shaft 43a, 43b, in the functioning phases where the mechanism assembly 92a, 92b offers the least resistance. In this manner, the torsion springs 89a, 89b play the role of mechanical memory means storing up the amplitude of the control of the control shaft 90 corresponding to an inclination modification. The springs 89a, 89b also play the role of detector of resistance and transmit a control rotation only when the resistance opposed by the corresponding assembly 92a, 92b is less than a predetermined threshold value. In this manner, it is ensured that the inclination modifications of each angled bearing and the play adjustments do not intervene during the constant speed displacement phases of the corresponding tappet(s) 8, 8' where this(these) tappet(s) transmits(transmit) power.

The secondary control shaft 43a, 43b brings about the rotation of the pinions 44a, 44'a, 44b, 44'b connected by a chain 45a, 45'a, 45b, 45'b to the play adjustment pinions 42a, 42'a, 42b, 42'b against the abutments 59, 62 of the angled bearings (such as was described above in reference to FIG. 4). Each control shaft 43a, 43b also supports a pinion 46a, 46b which meshes with a cooperating pinion 47a, 47b of a rotating satellite carrier of an epicycloidal train 48a, 48b.

In turning, the pinion 46a, 46b thus causes the rotation of the axles of the conical teeth satellite pinions 49a, 49b of the epicycloidal train 48a, 48b. One 50a, 50b of planetary pinions having the conical teeth of the epicycloidal train 48a, 48b cooperates with a pinion 51a, 51b and is connected by a chain 52a, 52b to the pinion 41a, 41b supported by the input cylinder 15. The other planetary pinion 53a, 53b having conical teeth cooperates in rotation with an output pinion 54a, 54b meshing with the external teeth 40a, 40b of the double teeth control crown 34a, 34b, supported by the cylinder 15a, 15b. The internal teeth of the control crown 34a, 34b mesh with the pinions 31, 32 to maintain (if it stays immobile with respect to the cylinder 15) or cause to vary (if it turns with respect to the cylinder 15) the inclination of the angled bearings.

Therefore, when the control shaft 43a, 43b does not turn, the planetaries 50a, 50b, 53a, 53b turn in opposite direction relative to one another at the same absolute speed and are pulled by the pinion 41a, 41b and the crown 34a, 34b. The rotation of the secondary control shaft 43a, 43b engenders a rotation in the axial of the satellites 49a, 49b and thus a relative angular shift of the crown 34a, 34b with respect to the pinion 41a, 41b and to the cylinder 15. The pinions 31, 32 turn and the inclination angle is modified. This same rotation of the control shaft 43a, 43b engenders also a rotation in the pinions 42a, 42'a, 42b, 42'b modifying the length of the throat 21, 21' in which the crown portion 20, 20' of the interior casing 14, 14' of the corresponding angled bearing is inserted.

In the represented example, the control mechanism comprises a mechanical control assembly 92a, 92b and an epicycloidal train 48a, 48b for each line of fixed shaft 2a, 2b. In a non-illustrated variation, it is possible to envisage only a single secondary control shaft 43a, a single control assembly 92a, a single epicycloidal train 48a, whose output pinion 54a is coaxially connected to a second output pinion 54b meshing with the control crown 34b of the cylinder 15b of the second fixed shaft 2b. In this case, the second torsion spring 89b is interposed between the two output pinions 54a, 54b.

When the control shaft 90 remains fixed, the inclination of the axle 13, 13' is the same for all angled bearings 7, 7', and remains constant. The transmission ratio therefore remains unchanged. The axles of the angled bearings 7a, 7b, 7'a, 7'b describe a rotation around each fixed axle 23a, 23b according to movements which are out of phase one with respect to the other by 90°, in such a manner as to transmit the out-of-phase movements to the driven shaft 6.

Bringing about the rotation of the control rotating shaft 90 is obtained from an action, by the user, on a control pedal 94 which allows the regulation of the transmission ratio and thus of the power transmitted to the driven shaft 6 by the variable speed drive according to the invention. A transmission device 95 is thus planned between this pedal 94 and the control rotating shaft 90.

It is to be noted that this transmission device 95 can be reduced to its simplest expression, meaning, for example, in the form of a mechanical transmission. Indeed, thanks to the fact that the variable speed drive comprises several engaged angled bearings having alternatively out-of-phase movements, the adjustment of the inclination of the angled bearings and of the play of the abutments 59, 62 does not necessitate the application of a large control force, as this adjustment is carried out progressively, bearing by bearing, in the phases of movement where the angled bearing does not transmit a force, meaning during the acceleration and deceleration phases of the corresponding tappet 8. Moreover, the inertial forces of the tappets are constructively compensated by the straightening up coupling of the angled bearings which tends to further diminish the force necessary to control the variation of the inclination. In practice, this force is limited by the force necessary to engender the torsional tension in one direction or the other of the torsion springs 89a, 89b interposed between the control rotating shaft 90 and each of the two control secondary shafts 43a, 43b of each fixed axle line 23a, 23b.

The control of the adjustment of the transmission ratio of a variable speed drive according to the invention thus does not necessitate a hydraulic control device which is costly, bulky and susceptible to affect the overall efficiency of the transmission.

In the embodiment shown in FIG. 13, the variable speed drive according to the invention is nevertheless equipped with a device 95 for the transmission of the control signal to the electronic control unit.

This transmission device 95 comprises an electronic signal processing device 80 which computes a control signal 87 for an electrical motor 81 whose shaft is coupled to the pinion 82 of the control rotating shaft 90. The electronic device 80 receives a position signal 83 of the driving shaft 81, a speed signal 84 of the input driving shaft 5 of the variable speed drive, a signal 85 identifying the direction of the couple transmitted by the variable drive (direct or retrograde direction), and a position signal 86 of the pedal 94 activated by the user. The electronic device 80 is a computer device and comprises random access and read only memory and calculating processors. It is programmed to compute the control signal 87 of the electric motor 81, as well as a thermodynamic parameter control signal 88 of the thermal motor associated with the variable speed drive, notably of opening of the admission gas delivered by the carburetor of the thermal motor. According to the invention, the electronic device 80 is programmed to optimize the specific consumption of the thermal motor by adjusting the average effective temperature of the thermal motor. To do this, the specific isoconsumption and of effective average temperature as a function of rotational speed are stored in the electronic device 80.

Each turning assembly formed by the cylinder 15, the pinions 31, 32, the pinions 27, 27', 28, 28' of the crown 34a, 34b, form, with the inclination control mechanism shown in FIG. 13, —and notably with each control assembly 92a, 92b —orientation control means of the axles 13, 13' of the angled bearings 7, 7' supported by each fixed shaft 2a, 2b.

In a variable drive according to the invention, a variation (increase respectively decrease) of the transmitted power can be obtained by a variation (reduction, respectively, increase) of the inclination of the angled bearings engendering a variation (increase respectively decrease) of the speed of the thermal motor.

The free extremity 58, 58' of each tappet 8, 8' facing the bearing areas 19, 19' and 22, 22' cooperating with the angled bearings forms the internal screw of a second transmission device 9, 9' constituted by a screw having axially preconstrained balls without recycling whose transmission ratio is fixed. The alternating axial translational movements of the tappets 8, 8', are thus transformed into angular oscillations of a threaded oscillating shaft 10, 10' forming the nut of the ball screw.

This oscillating shaft 10, 10' is connected to the output pinion 4a, 4b via a third unidirectional transmission device 11a and 11b, 11'a and 11'b (FIGS. 1 and 3) which transmit the movement of the oscillating shaft in a single rotational direction. Each third unidirectional transmission device comprises two unidirectional linking devices 101, 101', 102, 102' mounted in opposite directions, meaning an internal retrograde device 101, 101' (101a, 101'a, 101b, 101'b in FIG. 1) which carries out a unidirectional blockage in the retrograde direction, and an external driving device 102, 102' (102a, 102'a, 102b, 102'b in FIG. 1) concentric relative to the former and carrying out a unidirectional blocking in the driving direction. Each unidirectional linking device can be controlled between a unidirectional blocking active position and an inactive position leaving the oscillating shaft 10, 10' and the rotating unit 12, 12' connected to the output pinion 4a, 4b free in rotation one with respect to the other.

Each unidirectional linking device 101, 101', 102, 102' is constituted by a helicoidal spring whose one extremity is anchored in the rotating unit 12, 12' and whose other extremity cooperates with a frictional bearing area 103, 103', respectively 104, 104'. When each frictional bearing area is applied against the extremity of the spring, it carries out a unidirectional blocking. To the contrary, when this frictional bearing area is not applied against the extremity of the spring, the rotating unit 12, 12' is in free rotation with the respect to the oscillating shaft 10, 10'.

The two helicoidal springs are mounted in opposite direction (meaning that their coils wind in opposite directions) to carry out the unidirectional blockings in the two rotational directions of the oscillating shaft 10, 10'. Each spring constitutes a unidirectional linking device operating as a freewheel, meaning in one of the directions of rotation of the oscillating shaft 10, 10' and the other in the other rotational direction of the oscillating shaft 10, 10'.

The mechanism comprises, moreover, for each spring, functioning control means of the mobile frictional bearing area so that each spring can be controlled, in functioning, at high frequency (for the retrograde mode) and independently one with respect to the other in the active position or in the inactive position. The two springs are concentric. The oscillating shaft 10, 10' defines two cylindrical walls extending to the respective interior of each spring in such a manner that the coils of these springs can tighten themselves against the cylindrical walls in an active position. The general functioning principle of such a spring functioning as freewheel is known in itself, (notably in French patents FR-1.166.870 or FR-1.540.975). A sufficient axial force is applied against the frictional bearing area 103, 103', 104, 104' against the extremity of the spring in such a manner as to cause a tightening of the coils of the spring against the cylindrical wall of the oscillating shaft 10, 10' in such a manner as to cooperate in the rotational direction the oscillating shaft 10, 10' and the output unit 12, 12'. Each frictional bearing area 103, 103', 104, 104' has a truncated shape to form a corner which engages the interior of the spring adapted to block itself in rotation by rubbing contact.

The frictional bearing areas 103, 103', 104, 104' cooperate with an extremity 105, 105', 106, 106' of each respective spring. The opposite extremity 107, 107', 108, 108' of each spring is blocked in rotation with respect to the output rotating unit 12, 12' which comprises two mortices 109, 109', 110, 110' in which the axially folded extremities of the springs are engaged and anchored. Moreover, the output rotating organ 12, 12' defines two cylindrical external sleeves extending immediately to the exterior and the length of each respective spring. The output rotating unit 12, 12' is coupled to the output pinion 40a of the fixed corresponding axle 23a. Each third transmission device according to the invention is supported and guided with respect to the casing 1 of the variable speed drive thanks to ball bearings 111, 111'.

The largest diameter spring 102, 102' situated at the exterior constitutes a unidirectional linking device in the driving direction of the oscillating shaft 10, 10', meaning that it pulls the output rotating device 12, 12' in the driving rotation direction only when the oscillating shaft 10, 10' turns in this driving direction. For the spring 102, 102', the direct direction is thus the driving direction of the oscillating shaft 10, 10'. The control means of the frictional bearing area 104, 104' cooperating with this spring 102, 102' comprise a clutch element 113, 113' which forms to the side of the spring a crown axially extended by an end skirt forming the frictional bearing area 104, 104'. This crown is axially extended on the other side by linking blades 114, 114'. The clutch element 113, 113' is blocked in rotation with respect to the oscillating shaft 10, 10', but is movably guided in axial translation with respect to this oscillating shaft 10, 10'. An associated crown 115, 115' of the oscillating shaft 10, 10' is traversed by the linking blades. Washers are placed around the linking blades 114, 114' and form inclined bearing areas 116, 116' in which trapezoidal section slippers 117, 117' can be engaged. These slippers 117, 117' have a volume of revolution shape or a prism shape. A Belleville washer 118, 118' recalls the frictional bearing area in an active position. The slippers 117, 117' allow to separate the frictional bearing area 104, 104' from the spring 102, 102' and to place it in an inactive position upon encountering the recall force exerted by the washer 118, 118'.

Figure 15:
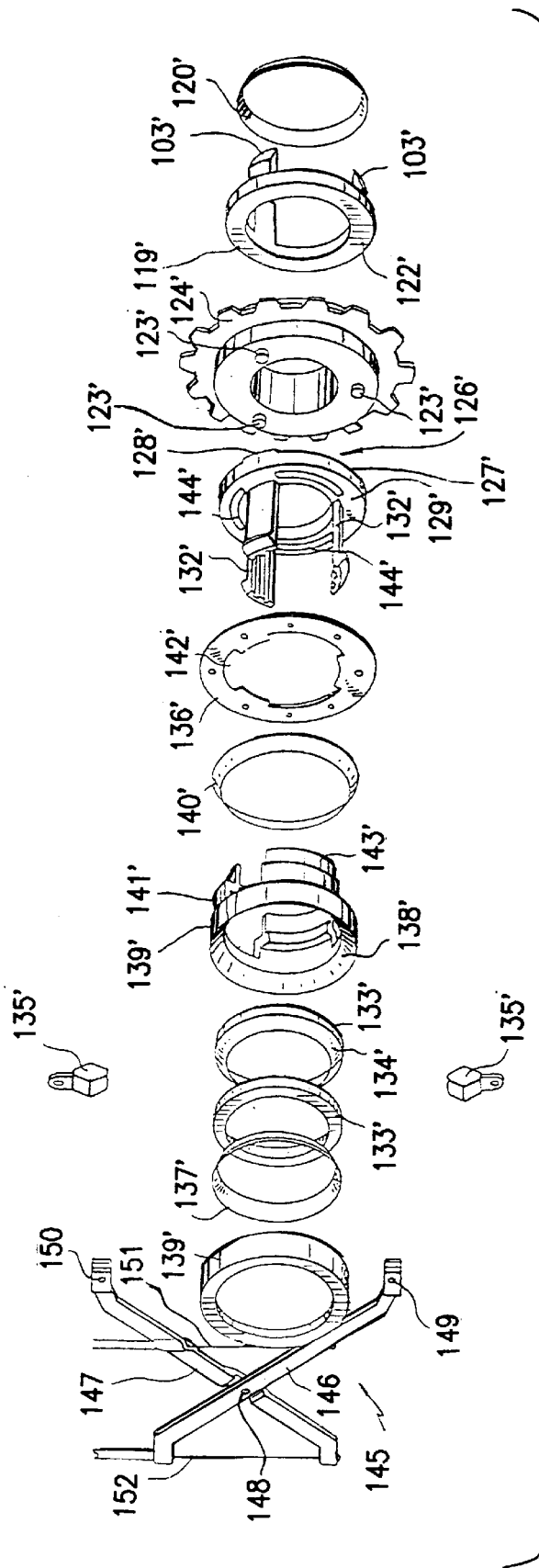
FIG. 15 is a perspective exploded schematic view illustrating a control mechanism of a unidirectional linking device of a variable drive according to the first embodiment of the invention.

The device for controlling the internal spring of one 11'a and 11'b of the transmission devices is represented in more detail in FIG. 15. The internal spring 101' constitutes a retrograde direction unidirectional linking device, meaning in the opposite direction relative to the driving direction. For this spring 101', the direct direction is thus the retrograde direction. In this manner, the spring 101' can be commutated either in a functioning mode in which it transmits a retrograde movement of the oscillating shaft 10' to the output rotating unit 12', or in a functioning mode wherein it transmits, only in the driving direction of the oscillating shaft 10', a resistive couple of the output rotating unit 12' (engine brake) to the oscillating shaft 10', or in a functioning mode wherein it is permanently inactive.

In the functioning mode with engine brake, when the oscillating shaft 10' turns in the retrograde direction and the output rotating unit 12' must turn in the driving direction, the spring 101' must be placed in an inactive position, meaning that it must not carry out a unidirectional linking. But, when the oscillating shaft 10' turns in the driving direction like the output rotating unit 12', to transmit an engine brake between the two shafts, the spring 101' must be commutated in a cyclical fashion in high frequency functioning in an active position in the driving direction of the oscillating shaft 10' and in an inactive position in the retrograde direction of the oscillating shaft 10'.

To the contrary, when the functioning mode in the retrograde direction (in reverse) is chosen, the spring 101' must be permanently in the inactive position to transmit the oscillations in the retrograde direction of the oscillating shaft 10' into a retrograde movement of the output rotating unit 12'.

The frictional bearing area 103' of the spring 101' is formed by three lugs angularly spaced by 120° with respect to one another extending in axial projection toward the spring 101' and supported by a pierced crown 119'. A Belleville washer 120' is placed around the lugs and pushes on one side of the crown 119' and on the other side on a radial bearing surface 121' (FIG. 3) of the oscillating shaft 10' to push back the frictional bearing area 103' in an inactive position. The lugs whose number can be different from three form a frictional bearing area 103'.

The radial face 122' of the crown 119' and which is axially opposed to the lugs is pushed back by the washer 120' in contact with a plurality of tappets 123' extending in parallel to the fixed axle 23a, uniformly distributed around this axle and mounted in a freely slidable axial translation manner through a pinion 124' which is itself rotatively mounted with respect to the casing 1 around the fixed axle 23a thanks to a ball bearing 125' (FIG. 3). The tappets 123' are controlled in their axial translation movement by a cam 126' having axial indentations 127' and axial bosses 128' formed on a radial face of a control crown 129'. The control crown 129' is mounted on a cylindrical support 130' (FIG. 3) cooperating with the casing 1 via axial grooves 131' which block the control crown 129' in rotation but allow axial translation movements.

The control crown 129' is axially extended opposite the cam 126' by linking blades 132' which carry two washers 133' and define between themselves internal inclined bearing areas 134' cooperating with the control slippers 135' which can be engaged between these inclined bearing areas 134' when they radially approach the fixed axle 23a of the fixed shaft 2a.

The free extremities of the linking blades 132' form a projecting shoulder toward the exterior holding the extremity washer 133'. The other washer 133' presses against a crown 136' fixed to the casing 1, and the linking blades 132' traverse the axial piercing of this crown 136'. A Belleville washer 137' presses on one side on a radial face of the casing 1 and on the other side on the free extremities of the linking blades 132' (FIG. 3) to axially push away the cam 126' in contact with the tappets 123'. The Belleville washer 137' therefore constitutes a recall means for the frictional bearing area 103' in applied position against the corresponding extremity of the spring 101'.

The axial recall force exerted by this Belleville washer 137' is greater than the axial recall force exerted by the Belleville washer 120' described above mounted in an opposite direction around the lugs forming the frictional bearing area 103'. The pinion 124' is driven in rotation by a chain and a driving device (FIG. 14) in a manner that is synchronized with the speed of the rotation of the driving shaft 5 of the variable speed drive which generates the alternating movements of the tappets 8' and the alternating oscillations of the oscillating shaft 10' by the intermediary of the ball screw 30. Upon the rotation of the pinion 124', the tappets 123' come alternatively in contact with the bosses 128' and the grooves 127', which engenders alternating axial translation movements of the frictional bearing area 103'. In this manner, when the control slippers 135' are not engaged in the throat formed by the inclined bearing areas 134', the frictional bearing area 103' is alternatively controlled in the active position and in the inactive position by the cam 126' thanks to the rotation of the pinion 124'.

When the slippers 135' are engaged in contact with the internal inclined bearing areas 134', the cam 126' is away from the tappets 123' upon being subject to the recall force of the washer 137', and the frictional bearing area 103' is permanently in an inactive position.

The spring 101' carrying out a retrograde direction blocking, the bosses 128' controlling the frictional bearing area 103' in the active position, are distributed on the cam 126' in such a manner that the spring 101' carries out a unidirectional blocking in the retrograde direction when the oscillating shaft 10' turns in the driving direction. From then on, a resistive couple can be transmitted to the output unit 12' to the oscillating shaft 10' when this latter turns in the driving direction, in this manner, an engine brake is realized.

The spring 101' is also used to carry out a unidirectional blocking in the retrograde direction when the oscillating shaft 10' turns in the retrograde direction to transmit a movement in reverse.

Figure 16:
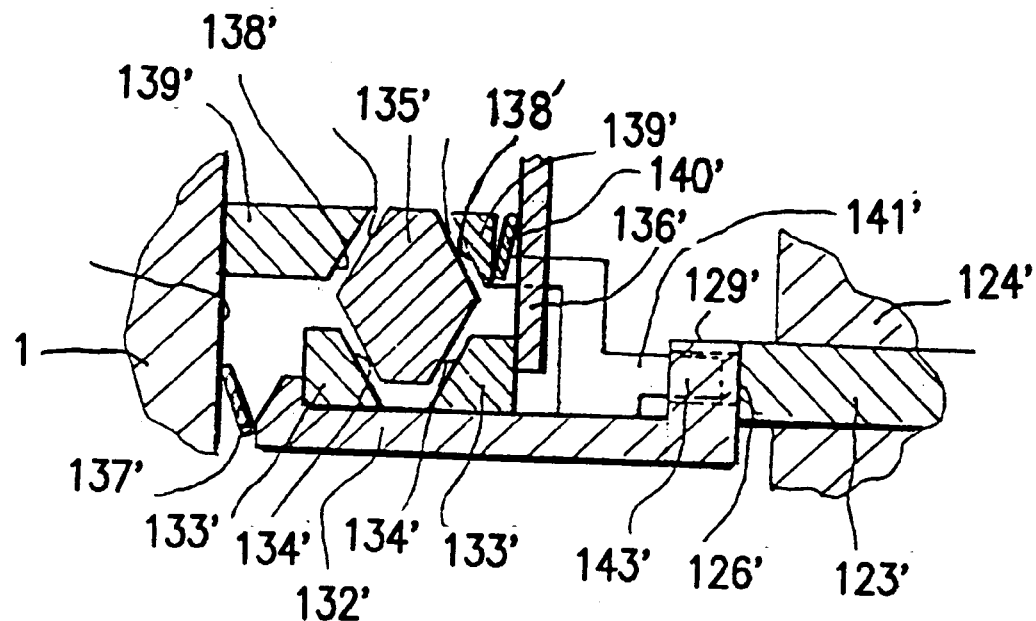
FIG. 16 is a partial axial sectional view of details of the mechanism of FIG. 15.

To do this, the control slippers 135' have a double trapezoidal cross section, meeting a lozenge whose radial summits are truncated to form two trapezoids connected by their largest space (FIG. 16). The slippers 135' are constituted by a portion of a volume of revolution or a prism.

The external inclined surfaces of the slippers 135' can be engaged between the external inclined bearing areas 138' arranged in the external washers 139' around the washers 133' described above. The inclined bearing areas 138' form a throat having a cross section flared toward the axle 23a of the corresponding fixed shaft 2a, and which is symmetrical with the internal throat formed by the internal inclined bearing areas 134' described above. The external extreme washers 139' press against the radial face of the casing 1. The other washer 139' presses against the crown 136' cooperating with the casing 1 by the intermediary of a Belleville washer 140' which elastically pushes it back toward the control slipper 135'. This slipper 139' is axially extended to the cam 126' by three axial extensions 141' (FIG. 15) extending between the linking blades 132' through the indentations 142' of the axial piercing of the crown 136'.

The free extremities 143' of these extensions 141' are engaged in cylindrically shaped openings 144' axially arranged through the control crown 129'. In this manner, the cylindrical free extremities 143' of the axial extensions 141' can traverse the crown 129' to fill the indentations 127' between the bosses 128' of the crown 129' (FIG. 15).

The linking blades 132' extend axially facing each of the bosses 128' of the cam 126'.

In this manner, when the slippers 135' are radially separated toward the exterior in contact with the external inclined bearing areas 138', the washer 139' is axially pushed back to meet the Belleville washer 140' and the free extremities 143' of the axial extensions 141' come to fill the indentations 127' of the cam 126'.

Doing this, the frictional bearing area 103' stays permanently in the active position, the spring 101' carrying out a unidirectional blocking in the retrograde direction. The output unit 12' is then driven in the retrograde direction by the oscillations, in the retrograde direction, of the oscillating shaft 10'. In neutral position, slippers 135' (FIGS. 3 and 16), bosses 128' and the indentations 127' of the cam 126' cooperate with the tappets 123' to control in a cyclical fashion the frictional bearing area 103'. And when the slippers 135' are radially brought together in contact with the internal inclined bearing areas 134', the frictional bearing area 103' is in the inactive position.

The Belleville washer 140' pushes back the washer 139' in a position where the free extremities of the axial extensions do not fill the indentations 127', and this when the slippers 135' are in a neutral position or radially brought together toward the interior.

FIG. 15 also shows an embodiment of the maneuvering means 145 of the different control slippers 135, 135', 117, 117'. These maneuvering means 145 are constituted by pliers comprising two articulated arms 146, 147 around an axis 148 parallel to the axle 23a of the corresponding fixed shaft 2a.

The fixed slippers 135, 135' or 117, 117' are mounted and articulated to the extremities of the arms 146, 147 around an axis 149, 150 parallel to the articulation axis 148 of the arms and to the fixed axle 23a of the oscillating shaft 10' and of the corresponding fixed shaft 2a.

A control cable 151 allows to tighten the pliers thus constituted and to radially bring the slippers closer to one another.

Another control cable 152 disposed opposite the articulation axis 148 with respect to the first, allows to separate the arms 146, 147 and thus to radially separate the slippers toward the exterior. Similar maneuvering means are used for the slippers 117, 117' of the external spring control device 102, 102'.

The spring control means 101' can be the object of other variations in their embodiment. For example, the bosses 128' of the cam 126' can be disposed to separate the frictional bearing area 103' from the extremity of the spring 101', recall means being planned to apply this frictional bearing area 103' in active position against the extremity of the spring 101'. One can thus better control the axial application force of the frictional bearing area 103' on the spring 101' as previously indicated. Also, the number of tappets 123', the indentations 127' and bosses 128', the linking blades 132' and the axial extensions 141' can be different than three. The lugs forming the frictional bearing area 103' can also be replaced with an extremity skirt such as described for the frictional bearing area 104, 104' of the external spring 102, 102'.

Figure 17:
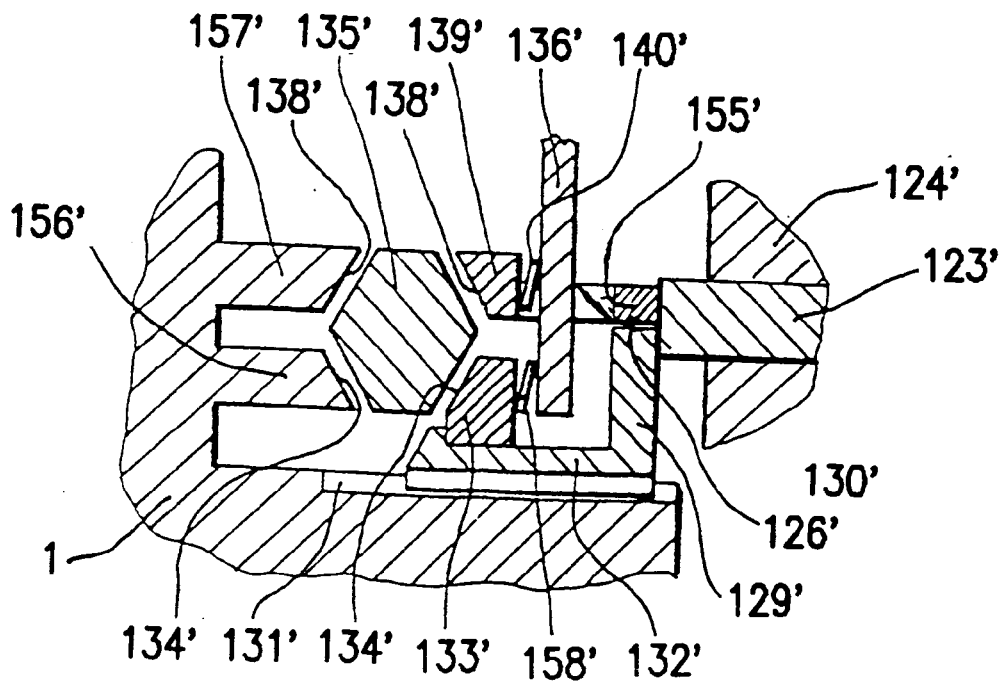
FIG. 17 is a sectional view which is similar to FIG. 16 illustrating a variation in the implementation of the mechanism.

FIG. 17 represents a variation of the embodiment of FIG. 16 in which the axial extensions 141' come into axial abutment on a complete peripheral cylindrical sleeve 155' which covers the exterior of the crown 129' forming the cam 126' to inactivate this cam. When the slippers 135' are separated toward the exterior, the extreme free edge of the sleeve 155' comes to push the tappets 123'. Moreover, the extreme washers forming the internal and external extreme inclined bearing areas are replaced by extensions 156', 157' cooperating with the casing 1. The internal washer 133' forming the internal inclined bearing area 134' next to the spring is supported by linking blades 132' and presses against the crown 136' cooperating with the casing 1 through the Belleville washer 158' which pushes it back toward the control slipper 135'. From then on, in the neutral position of the control slipper 135', the unidirectional transmission device is inactive, the frictional bearing area 103' is not engaged against the spring 101'. When the control slippers 135' are engaged in the internal inclined bearing areas 134', the cam 126' cooperates with the tappets 123' and the spring 101' is activated in the functioning mode with engine brake. When the control slippers 135' are brought apart in the external inclined bearing areas 138', the spring 101' is activated in the functioning mode in the retrograde direction.

Figure 14:
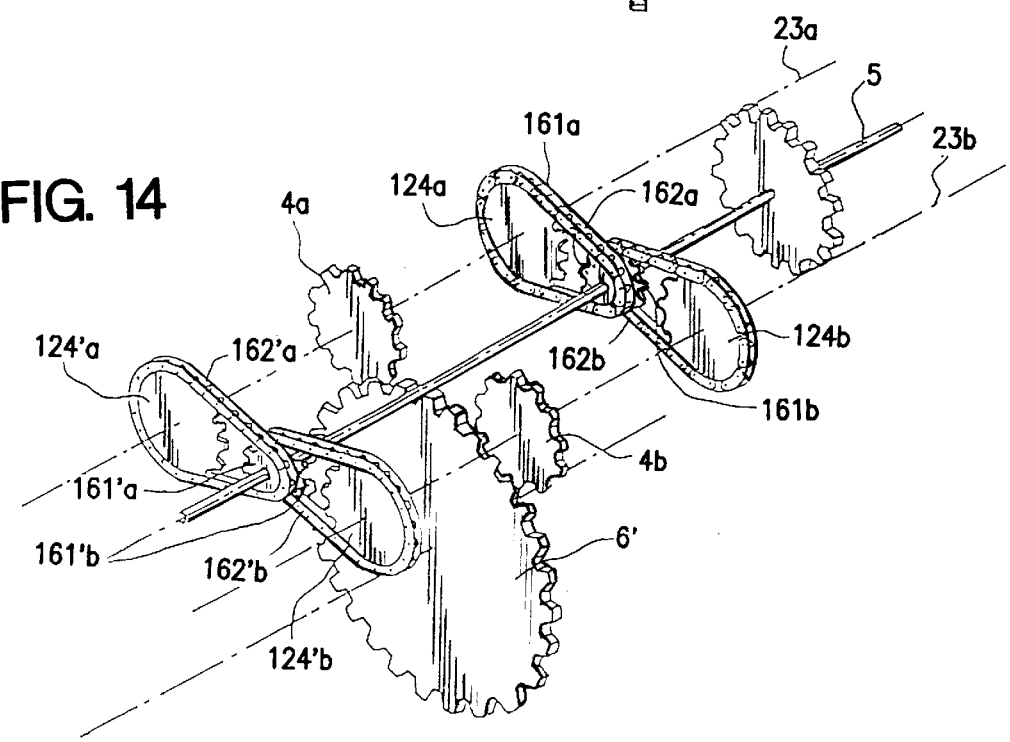
FIG. 14 is a perspective schematic of a control mechanism of the functioning of the unidirectional linking devices of a variable drive according to the first embodiment of the invention.

FIG. 14 represents an embodiment of the driving device of the control pinions 124a, 124'a, 124b, 124'b of the internal springs 101, 101' forming the unidirectional linking devices in the retrograde directions of the four unidirectional transmission devices 11a, 11'a, 11b, 11'b of the variable drive. The driving shaft 5 supporting the pinion meshing with the input pinions 3a, 3b is axially extended to carry and to drive in rotation the chain pinions 161a, 161'a, 161b, 161'b connected each to a chain 162a, 162'a, 162b, 162'b to the control pinion 124a, 124'a, 124b, 124'b of the unidirectional linking springs. The transmission ratio defined by these pinions and these chains is adapted as a function of the number of bosses and indentations of the cam 126' controlling the frictional bearing area 103, 103' of the spring 101, 101'. In FIG. 14 are also shown two output pinions 4a, 4b meshed with the pinion 6 forming the driven shaft.

Figure 9:
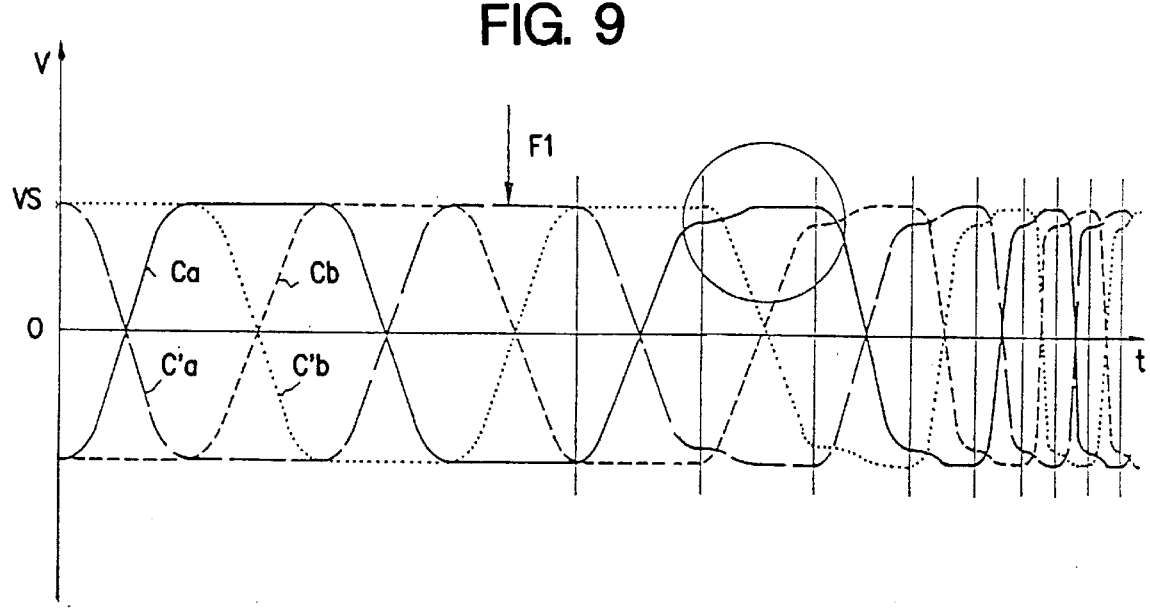
FIG. 9 is a graph representing the velocity waveforms of the tappets of a variable drive according to the invention with respect to time, and illustrating a reduction in the inclination engendering a reduction in the transmission ratio.

FIG. 9 shows a graph illustrating the movements generated by the variable speed drive on the driven shaft 6 from the rotation of the driving shaft 5. In this figure, four curves are represented, namely Ca, Cb, C'a and C'b representing respectively the translational speed of the four tappets 8a, 8b, 8'a, 8'b, or the rotational speeds of the four oscillating shafts 10a, 10b, 10'a, 10'b (FIG. 1) out of phase by 90° relative to one another.

Thanks to the third unidirectional transmission devices 11a, 11'a, 11b, 11'b the positive speeds of the four oscillating shafts are transmitted on the driven shaft 6 when the variable drive is controlled in a functioning mode in the driven direction. More exactly, the unidirectional transmission devices 11a, 11'a, 11b, 11'b couple the oscillating shafts to the driven shaft 6 only in the constant speed portions of the oscillating shafts. As is seen, these constant speed portions continuously follow one another in such a manner that the driven shaft 6 uniformly turns at the speed VS. The amplitude of oscillation of the oscillating shafts depends upon the value of the inclination angle of the angled bearings of the first transmission devices 7a, 7'a, 7b, 7'b.

Also the second 9a, 9b, 9a', 9b' and third 11a, 11b, 11'a, 11'b transmission devices constitute transmission means adapted such that, for each movement phase, one or less of the angled bearings 7a, 7b, 7'a, 7'b are engaged and transmit a force, whereas at least one of the angled bearings 7a, 7b, 7'a, 7'b (notably the three others in the first embodiment shown, and at least those supported by the other fixed shaft and whose inclination is controlled by another turning assembly) is not engaged and does not transmit force to the driven shaft 6.

In FIG. 9, there is represented the effect of a modification of the inclination of the angled bearings from an action schematically represented by the arrow F1 of the user on the control pedal 94. This action tends to diminish the inclination of the angled bearings with respect to the fixed axle 23a, 23b of the fixed shafts 2a, 2b.

Figure 10:
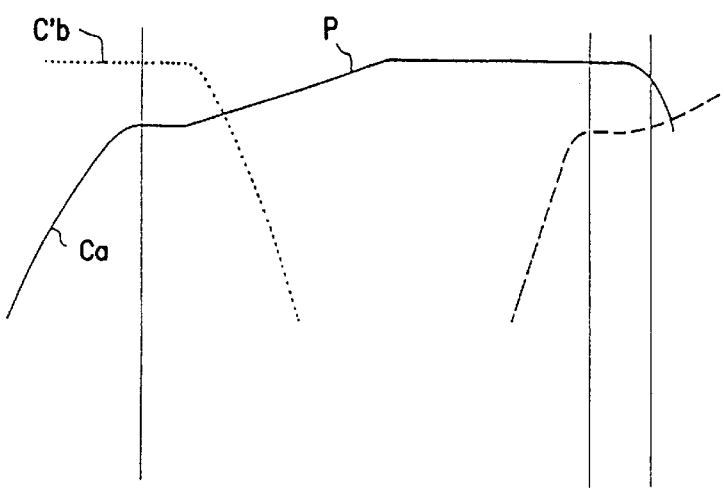
FIG. 10 is a detailed view of FIG. 9.

FIG. 10 represents, in more detail, the speed profile of a tappet 8a upon a modification of the inclination of the angled bearing. As was seen above, the angled bearings experience a modified inclination only during their acceleration or deceleration phases, meaning outside of the phases of the third corresponding unidirectional transmission device 11a, 11'a, 11b, 11'b and is engaged in the driving direction where the corresponding tappets have a constant speed.

At the end of a period of acceleration of the tappet 8a, the inclination of the angled bearing is diminished. As the driving shaft 5 turns at constant speed, a decrease in the speed of the tappet 8a occurs, during a first time period, at the end of the period of acceleration. Nevertheless, as soon as the unidirectional linking device 101a in the corresponding retrograde direction is clutched and as soon as the unidirectional linking device 11'b in the retrograde direction which was active immediately before is unclutched, the speed of the driving shaft 5 can accelerate according to the rising slope P shown in FIG. 10.

The speed of the tappet 8a increases, therefore, with that of the thermal motor associated to the driving shaft 5 until its matches the speed VS of the driven shaft 6 which is assumed uniform and imposed by the charge. The amplitude of the trajectory of the tappet 8a and the period of time necessary for this trajectory is diminished by a value which is proportional to the decrease in the inclination taken by the corresponding angled bearing 14a, 18a.

Other angled bearings see their inclination successfully modified one after the other in the same manner until they reach the value imposed by the user's command, meaning by the rotation of the control shaft 90 (FIG. 13). One obtains, in this manner, an increase of the power transmitted by the variable speed drive thanks to an increase in the rotational speed of the driving shaft 5 and of the associated thermal motor, the speed of the driven shaft 6 being assumed to be constant.

Figure 11:
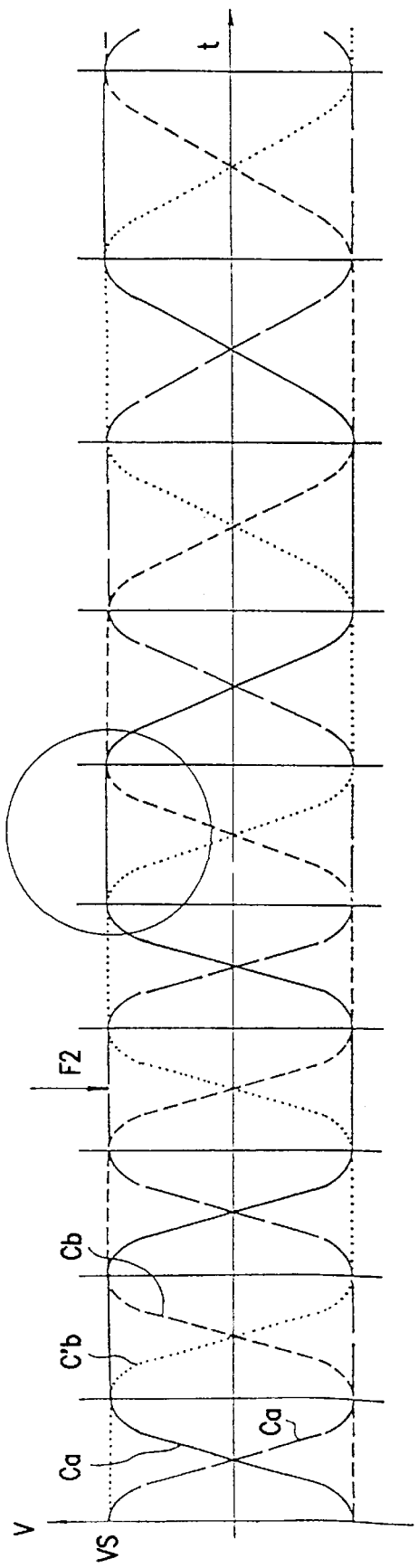
FIG. 11 is a view which is similar to FIG. 9 illustrating an increase in the inclination which engenders an increase in the transmission ratio.
Figure 12:
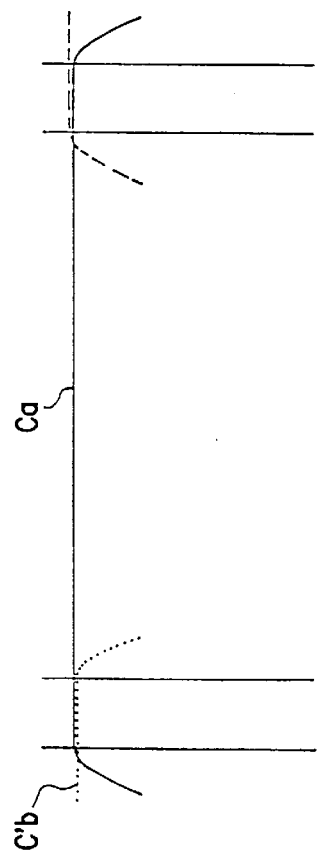
FIG. 12 is a detailed view of FIG. 11.

FIGS. 11 and 12 illustrate the shape of the speed curves upon an increase of the inclination of the angled bearings in view of decreasing the transmitted power. Because of the increase of the inclination of the angled bearing 14a, 18a, the tappet 8a should see its speed pass that of VS. of the driven shaft 6 at the end of the period of acceleration. This speed is nevertheless limited to that of the driven shaft 6 because of the clutching of the unidirectional linking device 101a in the retrograde direction at the end of the period of acceleration. The amplitude of the translational movements of each of the tappets increases thus successively and the rotational speed of the driving shaft 5 as well as that of the associated thermal motor consequently diminishes.

The arrow F2 schematically represents the instant when the user activates the control pedal 94 to decrease the power, meaning the moment when the control shaft 90 undergoes a rotation.

As is apparent from FIGS. 9 and 11, the variable speed drive according to the invention allows the generation of uniform speed movements onto the driven shaft 6 which continuously and successively follow each other. The transmission ratio of the variable speed drive is determined on the one hand, by the possible inclinations of the different inclined angled bearings, and on the other hand, by the ratios of the diameter of the different turning units coupled in rotation. The maximum power that such a variable drive can transmit is also limited by the pressure values in Hertz at the level of the contacts between the crown portions of the interior casings of the angled bearings and the lateral bearing areas cooperating with the tappets in contact with the crown portions. In practice, it can be determined by calculation that with a variable drive according to the invention whose size is substantially less than that of a conventional automatic gearbox, the admissible power corresponds to that of most of the thermal motors used in automobile vehicles. Nevertheless, the maximum power that the variable drive according to the invention can transmit can be increased with ease with little modification, according to needs.

Figure 18:
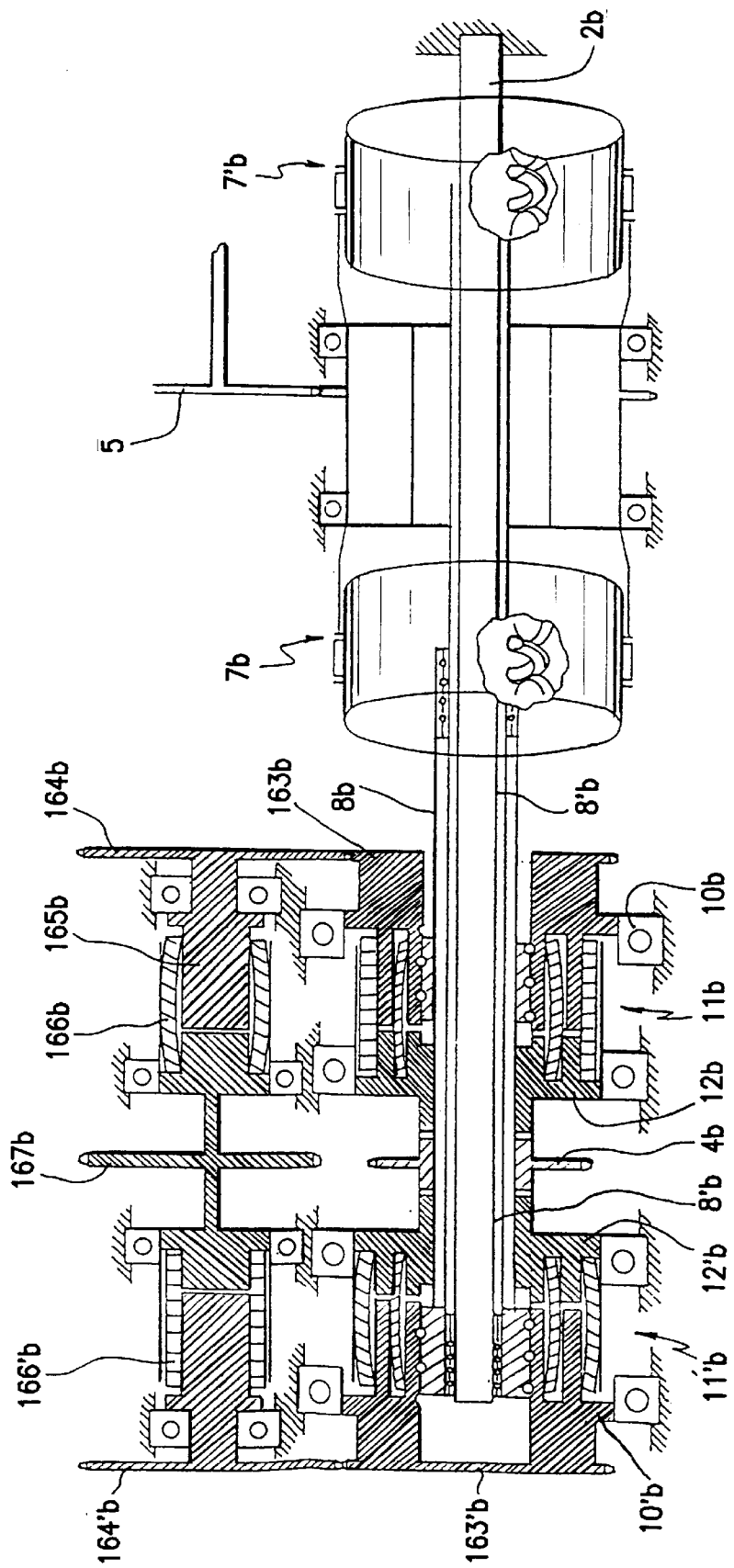
FIG. 18 is a partial axial sectional schematic illustrating the kinematics of a variation in the implementation of the three unidirectional transmission devices of a variable drive according to the invention.

For example, one can double this power by transmitting to the driven shaft the negative speed movements of each of the tappets 8a, 8b, 8'a, 8'b. FIG. 18 schematically illustrates such an embodiment. In this embodiment, each oscillating shaft 10b, 10'b is coupled to a pinion 163b, 163'b which meshes with a pinion 164b, 164'b cooperating in rotation with an oscillating shaft 165b, 165'b, whose rotational movements are in the inverse direction relative to that of the oscillating shaft 10b, 10'b. A spire spring 166b, 166'b functioning as a freewheel transmits the oscillations of the shaft 165b, 165'b in the driving direction to a second output pinion 167b coupled to the driven shaft 6. The unidirectional linking devices 166, 166'b formed by the springs are adapted to transmit the movements in the driving direction only and can be commutated in the active position and in the inactive position by control devices similar to those described above for the unidirectional linking devices 102, 102' in the driving direction. Of course, this embodiment described only with reference to the second fixed axle 23b is also utilized for the first fixed axle 23a. Under these conditions, the power transmitted to the driven shaft 6 is doubled.

Also, it is possible to associate to each angled bearing not only a single tappet 8a, 8b, 8'a, 8'b, but also several tappets, for example two tappets. The second tappet can cooperate with a crown portion diametrically opposed to the first described above. And the second tappet of a transmission assembly is associated with the same unidirectional transmission device as the first tappet of the other transmission assembly disposed around the same fixed axle. The maximum transmittable power is thus doubled.

Figure 19:
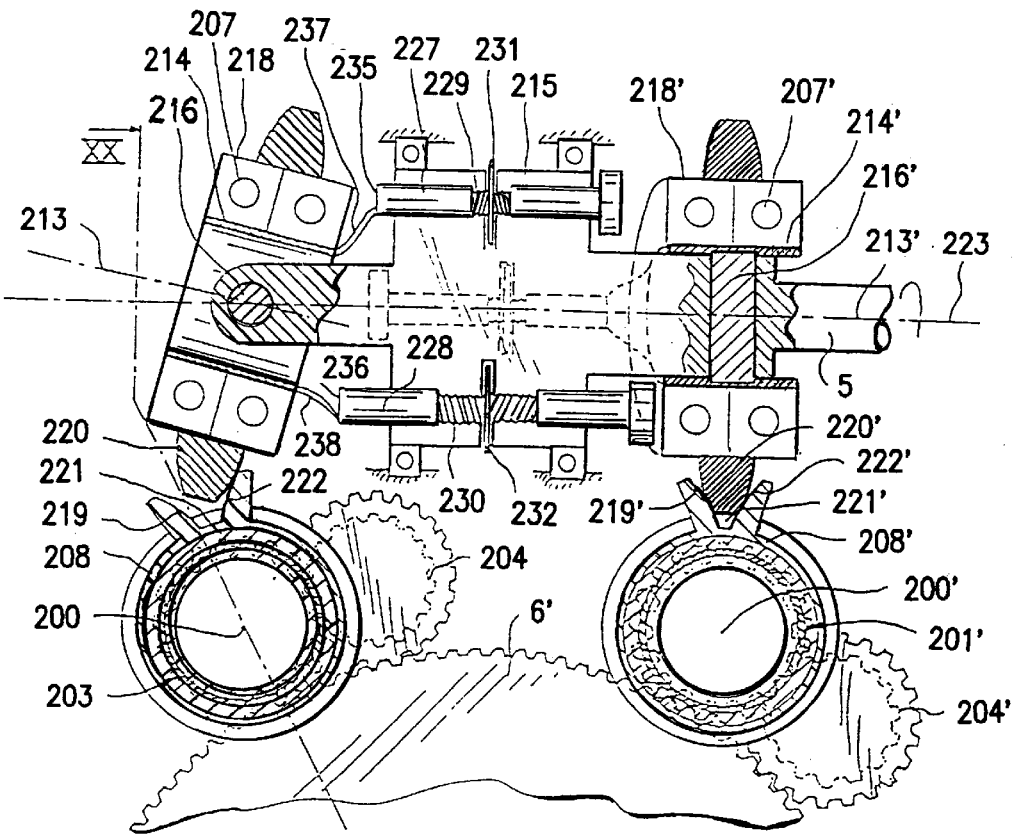
FIG. 19 is a sectional schematic view along the fixed axle of the angled bearings of a second embodiment of a variable drive having two angled bearings, according to the invention.
Figure 20:
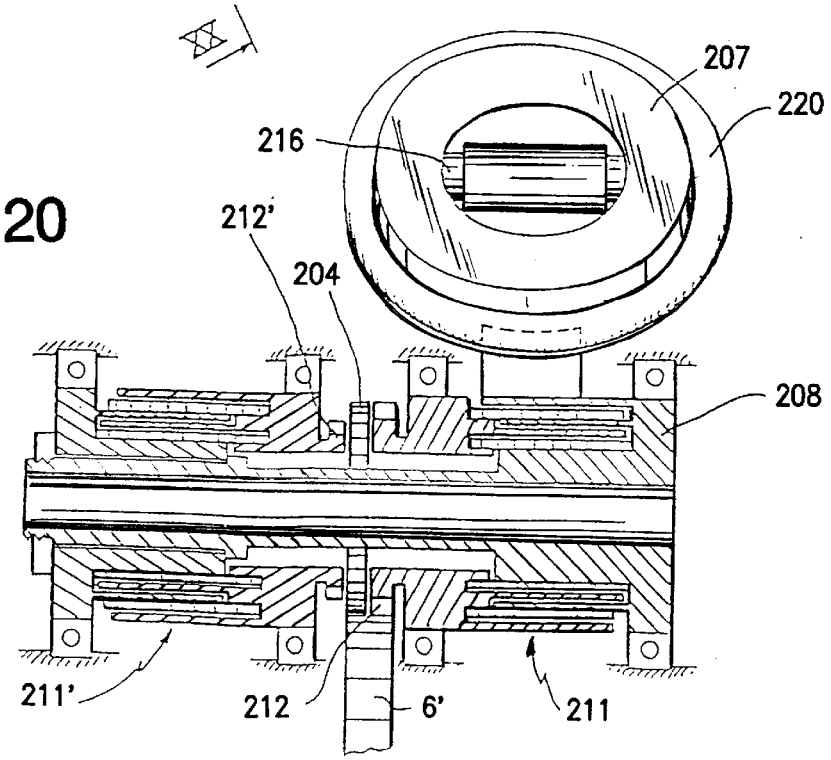
FIG. 20 is a sectional schematic view along lines XX—XX of FIG. 19.

FIGS. 19 and 20 represent a second embodiment of a variable drive according to the invention which only comprises two angled bearings 207, 207' driven both in rotation about a same single fixed axle 223. The two angled bearings 207, 207' are not in phase opposition, but are out of phase by 90° with respect to one another. These two bearings 207, 207' define axles 213, 213' inclined with respect to the fixed axle 223. In this manner, during the rotation, the axles 213, 213' turn around the fixed axle 223 while describing a cone, the radial plane of the bearing 207, 207' regularly oscillating on either side of a radial plane perpendicular to the fixed axle 223. The two axles 213, 213' present the same inclination angle with respect to the corresponding fixed angle 223 but are out of phase by 90° one with respect to the other (relative to the driving rotational movement), this out-of-phase angle remaining constant during the movement. Each of the oscillation movements of the bearing 207, 207' in one direction and the other is transmitted to the driven shaft 6 which, in the example of FIGS. 19 and 20 is a toothed crown.

The second embodiment differs also from the first in that the tappets 8, 8', of the first embodiment are replaced by tappets 208, 208' mounted in a freely rotating manner and oscillating around a fixed axle 200, 200' which is perpendicular to the fixed axle 223 of the bearings 207, 207'. More-over, the driving movement is received by the interior casing 214, 214' of the bearings 207, 207'. In this manner, in this embodiment, it is the interior casing 214, 214' of each bearing 207, 207' which constitutes the input casing receiving the driving movement through the intermediary of an assembly rotatively mounted around the fixed axle 223 and comprising a cylinder 215 rotatively mounted with respect to the chassis of the variable drive and driven in rotation, in a similar manner as the cylinders 15a, 15b of the variable drive according to the first embodiment shown in FIG. 1.

Each rotatable tappet 208, 208' cooperates with the external output casing 218, 218' of the corresponding angled bearing 207, 207' to receive the oscillating movements of this external casing and to transmit them to the receiving crown 6 through the intermediary of a unidirectional transmission mechanism 201, respectively 201' whose function is to transform the oscillating movements of the corresponding tappet 208, 208' in a rotating movement in a single direction of the receiving crown 6.

The cylinder 215 comprises a control and adjustment mechanism of the orientation of the axle 213, 213' of each bearing 207, 207' with respect to the fixed axle 223.

For the first angle bearing 207, the cylinder 215 comprises two pistons 227, 228 extending in parallel to the fixed axle 223, which are threaded in an inverse direction and respectively engaged in the corresponding threadings of the screw 229, 230 supported by the pinions 231, 232 which are themselves rotatively mounted on the cylinder 215 in such a manner as to be able to mesh with a control crown which can be one of the crowns 34a, 34b of the control mechanism of FIG. 13. When this control crown turns with respect to the cylinder 215, the pinions 231 and 232 turn around their axles, and the pistons 227, 228 slide in translation in parallel to the fixed axle 223. The two pistons 227, 228 are threaded in an inverse direction, and the threads of the screws 229, 230 are arranged in inverse directions. In this manner, when the first piston 227 moves in translation in parallel with the axle 223 in one direction, the other piston 228 moves in translation in parallel with the fixed axle 223 in the other direction. The functioning is thus similar to the control mechanism of the orientation of the axles of the bearings described in reference to the first embodiment of FIG. 1 (pistons 27, 27', 28, 28', threadings 29, 29', 30, 30', pinions 31, 32).

The free extremities 235, 236 of each piston 227, 228 press against a lateral bearing area 237, 238 cooperating with the interior input casing 214 of the bearing 207.

In FIG. 19, two other pistons are shown which are axially opposed from each piston 227, 228, and which extend on the other side of each corresponding pinion 231, 232 and carrying counterweights at their free extremities. In this manner, the equilibrium of the mechanism is ensured.

The inclination of the other angle bearing 207' is controlled by a similar mechanism shown in FIG. 9 in dashed lines.

Nevertheless, the two inclination control mechanisms of the two bearings 207, 207' are not controlled by the same control crown, in such a manner that each of the angled bearings 207, 207' has its inclination modified independently from the other.

To control the inclination of each of the bearings 207, 207', one can use, for example, the control assembly shown in FIG. 13, and couple the pistons 231, 232 of the first angled bearing 207 to a first control crown 34a, and the other pinions controlling the inclination of the other angled bearing 207' which are slightly axially displaced with respect to the first, on the second control crown 34b.

The cylinder 215 is axially extended at the side of each bearing 207, 207'.

The interior input casing 214, 214' of each bearing 207, 207' is connected to an extension of the cylinder 215 by a transversal axle 216, 216' which is perpendicular to the fixed axle 223. Each transversal axle 216, 216' cooperates, in rotation around the fixed axle 223, with the interior casing 214, 214' and the cylinder 215. Nevertheless, each transversal axle 216, 216' allows the internal input casing 214, 214' of the angled bearing to pivot with respect to this transversal axle 216, 216' upon the variations and the inclination of the axle 213, 213'. The two transversal axles 216, 216' are orthogonal one with respect to the other.

The external output casing 218, 218' of each angled bearing comprises a crown or a crown portion 220, 220' extending in radial projection toward the exterior in a throat 221, 221' defined by and between two radial bearing areas 219, 219', 222, 222' cooperating with the tappet 208, 208'. This crown 220, 220' and these bearing areas define contact surfaces of complementary shapes which are defined to roll one on the other while ensuring a rotational speed of the corresponding tappet 208, 208' which remains constant during at least a quarter turn of the rotation of the cylinder 215 and the interior casings 214, 214' of the bearings 207, 207'. In the case of the rotatively oscillating tappets 208, 208', these complementary shapes can be defined in a similar fashion as a gear.

As with the first embodiment of FIG. 1, a play adjustment mechanism between the bearing areas 219, 222 and, respectively, 219', 222' on either side of the crown portion 220, 220' can be provided. For example, one 222 of the bearing areas can be fixedly mounted with respect to the tappet 208, whereas the other 219 is tangentially movably mounted between the two extreme positions, one of which is displaced from the fixed bearing area 222, whereas the other is closer to the fixed facing bearing area 222. An element having a corner shape, parallel to the rotational axis 200 of the tappet 208, is axially movably mounted in such a manner as to be able to be more or less engaged in a space arranged between a radial bearing area cooperating with the tappet 208 and a pressing surface facing the bearing area 219. When this element having a corner shape is totally engaged, the bearing area 219 is in its closest position to the bearing area 222, the play being at a minimum. To the contrary, when this element having the shape of a corner is totally axially disengaged, the bearing area 219 is far from the bearing area 222, the gap between the two being at a maximum. The axial position of the element in the form of a corner can be controlled thanks to a pinion mounted rotatively around an axis 200, and which can cooperate with the control mechanism of FIG. 13 in a similar fashion as pinions 42a, 42b.

Each unidirectional transmission mechanism 201, 201' allows to transforme and to transmit to the receiving crown 6 the oscillating movements of each tappet 208, 208', while driving this receiving crown m in a single rotational direction.

To do this, one can use unidirectional transmission devices which are similar to the third unidirectional transmission devices 11, 11' described in reference to the first embodiment in FIGS. 1 to 3. For example, it suffices to rotatively couple the two oscillating shafts 10a, 10'a of the first embodiment of FIG. 1 to the oscillating tappet 208 of the second embodiment of FIG. 19, and the two oscillating shafts 10b, 10'b of the oscillating tappet 208'.

FIG. 20 represents, only schematically, in a similar fashion as FIG. 1, the two unidirectional transmission devices 211, 211' of the unidirectional transmission device 201. The structure can be similar to that shown in FIGS. 2 and 3. In particular, each device comprises two helicoidal springs mounted in opposite direction and control means according to a driving mode with engine brake and/or according to a retrograde mode and/or according to a neutral mode. One of the unidirectional transmission devices 211 comprises an output rotating pinion 212 which directly meshes with the receiving crown 6 and, the other unidirectional transmission device 211' comprises an output rotating pinion 212' which meshes with the receptive crown 6, through an inverting gear 204, 204'.

As seen in FIGS. 19 and 20, this second embodiment is simplified, in the sense that the variable speed drive only comprises two angled bearings, and does not comprise ball screws. Moreover, the size of the variable speed drive is further reduced because, notably, the tappets 208, 208' oscillate in rotation, and not in translation. One can consider that, this second embodiment differs from the first embodiment in that each of the two pairs of bearings of a single fixed shaft 2a, 2b is brought together in a single angled bearing whose oscillating movements in the two directions are transmitted to the receiving crown 6, the oscillating shafts 10, 10' operating as rotating tappets directly driven by the angled bearings.

As shown in FIG. 19, the driving shaft 5 can be directly coupled to the cylinder 215, in extension of this cylinder 215, and facing one 207' of the angled bearings.

In the third embodiment of FIGS. 21 and 22, the variable drive according to the invention further comprises two angled bearings 307, 307' mounted in a similar fashion as the second embodiment described above. The variable drive of this third embodiment is better adapted to a transmission for cycle. This simplified transmission allows the transmission to the receiving crown 6 of a rotational movement in the driving direction only, from a rotational movement of the driving shaft 5 coupled to a pedal, for example through a transmission having conical pinions, not shown.

The driving shaft 5 is directly coupled to the input internal casings 314, 314' of the angled bearings 307, 307', thanks to transversal axles 316, 316'. The inclination of the axle 313, 313' of each bearing 307, 307' is controlled in a similar fashion as the second embodiment thanks to a pinion 331, 331' supported by the cylinder 315. The pinion 331, 331' supports a screw 329, 329' whose threading cooperates with a threading of a piston 327, 327'. The free extremity of the piston 327, 327' has the shape of a screed receiving an axle cooperating with an extension 328, 328' of the interior casing 314, 314'. Each piston 331, 331' is controlled in rotation with respect to the cylinder 315 by a control mechanism of the inclination which is similar to that represented in FIG. 13, but which can also be simplified in this embodiment. Indeed, in place of the electrical motor 81, the control shaft 90 can also be directly acted upon by the user through a conventional transmission equipped with a cable.

Moreover, the mechanism of FIG. 13 utilized with the third embodiment can be simplified. In particular, this third embodiment does not necessitate a play adjustment mechanism between the contact bearing areas of each tappet. Consequently, the adjustment control mechanism of this play is not necessary.

As in the second embodiment, each angled bearing 307, 307' has its output external casing 318, 318' which supports a crown 320, 320' cooperating with the two tappets 308a, 308b, 308'a, 308'b, disposed diametrically opposite one another with respect to the corresponding angled bearing 307, 307'.

Each tappet is constituted by a cylinder mounted in a freely rotating manner around an axle 300a, 300b, 300'a, 300'b orthogonal to the fixed axle 323 of the driving shaft 5. Each tappet is mounted in a freely rotating manner with respect to the chassis of the variable drive by bearings. Each of the tappets 308a, 308b, 308'a, 308'b is similar to the tappets 208, 208' described with respect to the second embodiment. The same is true for the crowns 320, 320' of the bearings 307, 307'. In this manner, the tappets support bearing areas 319, 322 defining a throat 321 receiving the crown 320, 320' of the corresponding angled bearing 307, 307'.

A unidirectional linking device 311a, 311b, 311'a, 311'b having a helicoidal spring allows the transmission of the oscillations of each corresponding tappet 308a, 308b, 308'a, 308'b to the receiving crown 6.

The unidirectional linking device 311a, 311'a comprises a helicoidal spring 302'a which connects the inferior tappet 308a, 308'a to an output rotating unit 312'a supporting a pinion directly meshed onto the receiving crown 6 for a unidirectional transmission in the driving direction.

The helicoidal spring 302'b of the upper unidirectional linking device 311b, 311'b is wound in the opposite direction and allows the transmission of movements in the retrograde direction of the tappet 308b, 308'b. The output rotating units 312'b is connected to the receiving crown 6 by an inverting gear 304, 304'. In this manner, when the angled bearing 307, 307' pivots in one direction, the movement is transmitted by the lower unidirectional linking device 311a, 311'a, and when it pivots in the other direction, the movement is transmitted by the upper unidirectional linking device 311b, 311'b, the receiving crown 6 being driven in all cases in the driving direction of rotation.

The receiving crown 6 can be directly coupled to the hub of a bicycle wheel. The mechanism for the control of the inclination (not shown in FIGS. 21 and 22) is incorporated inside of the casing forming the chassis and enclosing the different elements of the variable speed drive according to the invention.

Thanks to the presence of the angled bearings 307, 307' out of phase by 90°, when the user causes an inclination modification, the control mechanism imposes this inclination modification progressively on each of the bearings 307, 307', in a movement phase where this bearing is not engaged on the receiving crown 6, and where the two corresponding unidirectional linking devices are declutched. Each bearing 307, 307', is, indeed, alternatively engaged during a quarter turn of rotation of the driving shaft 5 through, alternatively, each of the unidirectional linking devices 300a, 300'a, then 300b, 300'b.

In this manner, and thanks to the springs 89a, 89b of the control mechanism, the modification of the inclination requires substantially no effort, and is extremely simple.

In the second and third embodiments, the variable speed drive comprises two angled bearings centered on the same fixed axle 223, 323 which is the axle of the driving shaft 5. In a variation not shown, the two bearings can also be centered on two fixed and distinct axles.

It should be noted that a variable drive according to the invention results in a transmission ratio which can vary between 0 and a large value, typically on the order of double the largest transmission ratio of a conventional manual automotive gearbox (fifth speed of ratio 1). Moreover, all variation of the transmission ratio is carried out in a very short period of time, notably less than 1s. The variation of the transmission ratio does not substantially affect the efficiency of the transmission.

And the mechanical efficiency of the variable drive according to the invention is excellent. Calculations demonstrate that this efficiency is greater than 0.95.

A variable speed drive according to the invention is advantageously applied for the transmission of automotive terrestrial vehicles (FIGS. 1 to 3 or 19 and 20) or of a cycle (FIGS. 21 and 22). In the first case, it can be coupled to a thermal motor. It should be noted that it is then not necessary to provide a clutch, as the transmission ratio of the variable drive according to the invention can be regulated to a null value. Additionally, the variable drive according to the invention enjoys, in this application, many prominent advantages, notably:

an excellent transmission mechanical efficiency,
a very small size, and in particular less than that of a gearbox of equivalent transmitted power,
a cost price which is less than that of an automatic gearbox,
a decrease in the fuel consumption of the motor on the order of 5 to 30% because the thermodynamic parameters of the motor can be maintained, during functioning, to values which most approach those corresponding to the lowest consumptions (large opening of the admission of combustible gases), the accelerations and decelerations can be obtained essentially (except for starting the vehicle) by varying the transmission ratio,
short response time allowing quick accelerations of the vehicle,
an engine brake of great value, the motor turning at a high rate,
an average power gain available for competition vehicles because of the elimination of changing gears,
the ability to do away with differential and transfer boxes by using a variable speed drive coupled to each wheel of the vehicle,
an appreciable simplification in the driving of vehicles, in particular, to teach, in competition, or in military vehicles such as tanks.

I claim:

1. Variable speed drive to be connected to a rotating driving shaft (5) and to a rotating driven shaft (6), comprising:

at least two angled bearings (7, 7', 207, 207', 307, 307'), each angled bearing (7, 7', 207, 207', 307, 307') comprising an external casing (14, 14', 218, 218', 318, 318') and an interior casing (18, 18', 214, 214', 314, 314') defining a common axle (13, 13', 213, 213') which is the axle of said angled bearing, control means for the orientation of the axle (13, 13', 213, 213', 313, 313') of each angled bearing according to an inclination angle whose adjustable value with respect to a fixed axle (23a, 23b, 223, 323), determines the transmission ratio of the variable speed drive, one (14, 14', 214, 214', 314, 314') of the casings of the angled bearing is an input casing receiving a driving rotating movement and is driven in rotation around the fixed axle (23a, 23b, 223, 323) from the rotation of the driving shaft (5), the other (18, 18', 218, 218', 318, 318') of the casings of the angle bearing is an output casing driven with the angled bearing assembly according to alternating oscillation movements having an amplitude which is proportional to the inclination angle of the axle (13, 13', 213, 213', 313, 313') of the angled bearing with respect to the corresponding fixed axle (23a, 23b, 223, 323), this output casing cooperating with at least one tappet (8, 8', 208, 208', 308a, 308'a, 308b, 308'b) to control its alternating movements, transmission means (9, 9', 11a, 11b, 11'a, 11'b, 201, 201', 31 1a, 311'a, 311b, 311'b) adapted to transform and to transmit the alternating movements of each tappet in a unidirectional rotational movement of the driven shaft (6), said control means of the orientation of the axle (13, 13', 213, 213', 313, 313') of each angled bearing (7, 7', 207, 207', 307, 307') are adapted such that these axles (13, 13', 213, 213', 313, 313') normally exhibit the same inclination angle with respect to the corresponding fixed axle (23a, 23b, 223, 323) but ones of the axles are out of phase with respect to others of the axles relative to the driving rotating movement, in such a manner as to transmit to the driven shaft (6) the movements out of phase, said transmission means (9, 9', 11, 11', 201, 201', 311a, 311'a, 311b, 311'b) are adapted such that, for each movement phase, at least one of the angled bearings (7, 7', 207, 207', 307, 307') are engaged and transmit a force, and at least one of the angled bearings (7, 7', 207, 207', 307, 307') is not engaged and does not transmit force to the driven shaft (6), said control means of the orientation of the axle (13, 13', 213, 213', 313, 313') of each angled bearing (7, 7', 207, 207', 307, 307') are adapted to modify the inclination of all of the angled bearings (7, 7', 207, 207', 307, 307') based on a control signal of the variation of the transmission ratio of the variable speed drive, and said control means of the orientation of the axle (13, 13', 213, 213', 313, 313') of each angled bearing (7, 7', 207, 207', 307, 307') are adapted to progressively carry out the adjustments of the inclination of the angled bearings (7, 7', 207, 207', 307, 307'), the inclination of each angled bearing (7, 7', 207, 207', 307, 307') being modified in a movement phase where this angled bearing (7, 7', 207, 207', 307, 307') is not engaged and does not transmit effort to the driven shaft (6).

2. Variable speed drive according to claim 1, wherein said control means of the orientation of the axle (13, 13', 213, 213', 313, 313') of the angled bearings (7, 7', 207, 207', 307, 307') comprise:

movable control means (90) producing a control amplitude corresponding to an inclination modification, and, for each angled bearing (7, 7', 207, 207', 307, 307') or a group of angled bearings, which are simultaneously engaged, a control unit of an inclination control mechanism of the angled bearing(s) (7, 7', 207, 207', 307, 307'), and mechanical memory means (89a, 89b) interposed between the movable control means (90) and each control unit (34a, 34b), these mechanical memory means (89a, 89b) being adapted to store up a control amplitude corresponding to a modification of inclination and to transmit a rotation control to a control unit (34a, 34b) only when the resistance opposed by this control unit (34a, 34b) is less than a predetermined threshold value.

3. Variable speed drive according to claim 2, wherein the mechanical memory means (89a, 89b) comprise, for each control unit (34a, 34b), a torsion spring (89a, 89b) interposed between two rotating shafts (93a, 43a; 93b, 43b) of said control means for the orientation of the axle (13, 13', 213, 213', 313, 313') of the angled bearings (7, 7', 207, 207', 307, 307').

4. Variable speed drive according to claim 1. wherein said output casing (18, 18', 218, 218', 318, 318') of each angled bearing and the corresponding tappet (8, 8', 208, 208', 308a, 308'a, 308b, 308'b), define contact surfaces having complementary shapes defined to generate continuous successive alternating movements.

5. Variable speed drive according to claim 4, wherein the complementary shapes are defined such that, if the driving shaft (5) turns at a constant speed, the speed of the tappet (8, 8', 208, 208', 308a, 308'a, 308b, 308'b) is at least substantially constant during a duration corresponding at least to a quarter turn of the rotating driving shaft (5).

6. Variable speed drive according to claim 4, further comprising an axial play adjustment mechanism between the contact bearing areas (19, 19', 22, 22') of the tappet (8, 8') between which a crown portion (20, 20') extends supported by the output casing (18, 18') of the angled bearing, and common control means of the inclination of the angled bearings (7, 7', 207, 207', 307, 307') and said axial play adjustment mechanism, in such a manner that the adjustment of the axial play is carried out automatically as a function of the inclination of the angled bearings (7, 7', 207, 207', 307, 307').

7. Variable speed drive according to claim 1, wherein each tappet (8, 8', 208, 208', 308a, 308'a, 308b, 308'b) is connected to an output rotating unit (12, 12', 212, 212', 312a, 312'a, 312b, 312'b) by at least one unidirectional linking device.

8. Variable speed drive according to claim 7, wherein each tappet (8, 8', 208, 208', 308a, 308'a, 308b, 308'b) is connected to the output rotating unit (12, 12', 212, 212', 312a, 312'a, 312b, 312'b) by two unidirectional linking devices (101, 101', 102, 102') mounted in opposite directions, a driving unidirectional linking device (102, 102') carrying out a unidirectional blocking in the driving direction, and the other retrograde unidirectional linking device (101, 101') carrying out a unidirectional blocking in the retrograde direction.

9. Variable speed drive according to claim 8, further comprising control mechanisms of each unidirectional linking device (101, 101', 102, 102') according to at least three functioning modes:

a driving mode with engine brake in which the driving unidirectional linking device (102, 102') is always maintained in an active position and the retrograde unidirectional linking device (101, 101') is maintained in active position only when the corresponding tappet (8, 8') and the corresponding output rotating unit (12, 12') move in the driving direction, a retrograde mode in which the driving unidirectional linking device (102, 102') is always maintained in an inactive position and the retrograde unidirectional linking device (103, 103') is always maintained in the active position, and a neutral position in which the two unidirectional linking devices (101, 101', 102, 102') are maintained in the inactive position.

10. Variable speed drive according to claim 7, wherein each unidirectional linking device (101, 101', 102, 102') is constituted by a helicoidal spring whose one extremity is anchored in the rotating unit (12, 12') and whose other extremity cooperates with a movable frictional bearing area (103, 103', 104, 104'), and further comprising control means for the functioning of each movable frictional bearing area (103, 103', 104, 104') adapted such that, when the frictional bearing area (103, 103', 104, 104') is applied against the extremity of the spring (101, 101', 102, 102'), this latter carries out a unidirectional blocking, and such that when this frictional bearing area (103, 103', 104, 104') is not applied against the extremity of the spring (101, 101', 102, 102'), the rotating unit (12, 12') is in free rotation, each spring (101, 101', 102, 102') being able to be controlled in its functioning and at the active or inactive position.

11. Variable speed drive according to claim 10, further comprising a retrograde direction unidirectional linking spring (101, 101'), and means adapted to generate, in the driving mode with engine brake, alternating movements in axial translation of the frictional bearing area (103, 103') of the retrograde directional unidirectional linking spring (101, 101') which is commuted in a cyclical fashion to function at high frequency in the active position in the driving direction of the corresponding tappet and in the inactive position in the retrograde direction of the corresponding tappet.

12. Variable speed drive according to claim 1, further comprising two angled bearings (207, 207', 307, 307') out of phase by 90° one with respect to the other and wherein said transmission means (201, 201', 311a, 311'a, 311b, 311'b) are adapted to transmit to the driven shaft (6) the movements of each output casing (218, 218', 318, 318') alternatively during each quarter turn of the driving shaft (5).

13. Variable speed drive according to claim 1, further comprising two pairs of angled bearings (7a, 7'a, 7b, 7'b), each pair being supported by a fixed shaft (2a, 2b) distinct from the other pair, the two angled bearings of a same pair being out of phase by 180°, each angled bearing (7a, 7'a, 7b, 7'b) supported by a fixed shaft (2a, 2b) being out of phase by 90° with respect to each angled bearing (7b, 7'b, 7a, 7'a) supported by the other fixed shaft (2b, 2a).

14. Variable speed drive according to claim 1, further comprising at least one rotatable and oscillating tappet (208, 208', 308a, 308'a, 308b, 308'b) comprising at least one bearing area (219, 222) in contact with a bearing area cooperating with the output casing (218, 218', 318, 318') of an angled bearing (207, 207', 307, 307').

15. Variable speed drive according to claim 14, wherein the output casing (218, 218', 318, 318') is the external casing of the angled bearing (207, 207', 307, 307').

* * * * *